(12) United States Patent
Subramanian

(10) Patent No.: US 11,402,823 B2
(45) Date of Patent: Aug. 2, 2022

(54) SYSTEM FOR VALIDATING WORKSITES

(71) Applicant: Caterpillar Inc., Peoria, IL (US)

(72) Inventor: Gautham Subramanian, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 326 days.

(21) Appl. No.: 16/685,759

(22) Filed: Nov. 15, 2019

(65) Prior Publication Data

US 2021/0149369 A1 May 20, 2021

(51) Int. Cl.
| | | |
|---|---|---|
| G05B 19/4155 | (2006.01) | |
| G06Q 10/06 | (2012.01) | |
| G06Q 50/08 | (2012.01) | |
| G06T 7/00 | (2017.01) | |
| G06F 3/0482 | (2013.01) | |

(52) U.S. Cl.
CPC ....... *G05B 19/4155* (2013.01); *G06Q 10/063* (2013.01); *G06Q 50/08* (2013.01); *G06T 7/0002* (2013.01); *G05B 2219/45004* (2013.01); *G06F 3/0482* (2013.01)

(58) Field of Classification Search
CPC ............... G06Q 50/08; G06Q 10/0639; G05B 2219/45004
See application file for complete search history.

(56) References Cited

U.S. PATENT DOCUMENTS

| | | | |
|---|---|---|---|
| 6,112,143 A | 8/2000 | Allen et al. | |
| 11,127,211 B2* | 9/2021 | Ochiai | G05B 19/0428 |
| 2012/0216106 A1* | 8/2012 | Casey | G06F 40/174 |
| | | | 715/224 |
| 2012/0283906 A1* | 11/2012 | Anderson | G05D 1/0274 |
| | | | 701/25 |
| 2013/0006718 A1* | 1/2013 | Nielsen | G06Q 10/06312 |
| | | | 705/7.42 |
| 2016/0291147 A1* | 10/2016 | Bellett | G01S 17/89 |
| 2016/0292920 A1* | 10/2016 | Sprock | G06T 13/20 |
| 2017/0097227 A1* | 4/2017 | Sanders | G01S 17/88 |
| 2017/0107090 A1* | 4/2017 | Mondal | B66F 11/044 |
| 2019/0102623 A1* | 4/2019 | Flood | G06Q 10/00 |
| 2019/0138578 A9* | 5/2019 | Pinho | G06F 40/166 |
| 2019/0179816 A1* | 6/2019 | Tays | G06Q 50/06 |
| 2019/0220795 A1* | 7/2019 | Fox | G09B 5/06 |
| 2019/0228355 A1* | 7/2019 | Ward, II | G06Q 10/06 |
| 2019/0236373 A1* | 8/2019 | Hu | G06K 9/00718 |

(Continued)

FOREIGN PATENT DOCUMENTS

WO 2013049803 4/2013

*Primary Examiner* — Vincent H Tran
(74) *Attorney, Agent, or Firm* — Xsensus LLC

(57) ABSTRACT

A system for validating a worksite includes determining extents of a worksite at which a job is to be performed. A graphical representation of the worksite may be presented to a user via a graphical user interface on a user device. The graphical user interface may also include an indication of a current location of the user or the user device. Sensor data, including data indicating a position of the user or the user device, can be used to determine whether the worksite is valid. The worksite plan may include information about additional conditions for validating the worksite and additional sensor data can be used to further validate the worksite. Further aspects may include controlling machines at the worksite when the worksite is validated.

19 Claims, 9 Drawing Sheets

(56) References Cited

U.S. PATENT DOCUMENTS

| | | | |
|---|---|---|---|
| 2020/0151450 A1* | 5/2020 | Hishinuma | G06T 7/74 |
| 2020/0332479 A1* | 10/2020 | O'Donnell | E01C 19/23 |
| 2021/0027598 A1* | 1/2021 | Tran | G06N 5/048 |

* cited by examiner

SYSTEM FOR VALIDATING WORKSITES

TECHNICAL FIELD

This disclosure relates generally to controlling machines at worksites such as construction, industrial, and/or mining sites, and, more specifically, to systems utilizing sensors and data processing techniques to identify incidents and/or intervene in such incidents through machine control.

BACKGROUND

Many industrial worksites include machines, equipment, and/or personnel to perform various functions. For example, a mining site may include excavators, haul trucks, and operators to mine ore or other resources and dispose of waste. The operations of such machines and personnel must be coordinated in order to maintain efficiency at the site. In some instances, jobsite tasks may be assigned using non-line of sight (NLOS), e.g., remote, methods. Moreover, such tasks may be executed by remote-controlled machines and/or machines that are autonomous or semi-autonomous. Assigning tasks remotely and executing the tasks either remotely or autonomously can increase safety outcomes by reducing exposure of personnel to heavy machinery and certain operations. However, NLOS assignment of tasks and remote or autonomous control of machines may provide undesirable consequences if the worksite at which the task(s) are to be performed is not suitable. For example, attempting to execute tasks on an unsuitable worksite may result in excessive machine wear or damage, non-performance of the task, or other inefficiencies. Accordingly, it may be useful to validate a worksite prior to attempting to execute a task at the worksite.

An example system for determining an extent or perimeter of a worksite at which a task is to be performed autonomously or semi-autonomously is described in U.S. Pat. No. 6,112,143 (hereinafter referred to as the '143 reference). In particular, the '143 reference describes a system in which a learning mode is activated on a machine. While in the learning mode, the '143 reference describes positioning the machine at a plurality of locations on a perimeter of a worksite, and determining a perimeter based on position information associated with those locations. As explained in the '143 reference, the perimeter may be displayed to a user to confirm or otherwise verify the extents of the worksite. Once the bounds of the worksite are established, the learning mode may be deactivated, and the machine may perform autonomously or semi-autonomously within the perimeter. The '143 reference does not, however, disclose details related to determining that the worksite is otherwise ready for job execution. By way of non-limiting example, the '143 reference does not contemplate the presence of obstructions or other conditions that may impact the machine's ability to perform a task. As a result, incidents such as equipment failure resulting from an improper worksite may not be prevented by the techniques described in the '143 reference.

Example embodiments of the present disclosure are directed toward overcoming the deficiencies described above.

SUMMARY

In an aspect of the present disclosure, a computer-implemented method includes receiving, at a computing device, a worksite plan including at least one task to be executed by a machine at a worksite, a set of worksite condition parameters, and a boundary of the worksite; displaying, on a display of the computing device, a user interface comprising a map including a representation of the boundary of the worksite and a representation of a location of the computing device. The method can also include receiving location information including one or more updated locations of the computing device, and generating, based on the location information, a validation signal indicating that the worksite has been validated. The method can also include transmitting the validation signal from the computing device.

In another aspect of the present disclosure, a system includes a computing device; one or more sensors; one or more processors; and memory storing processor-executable instructions. When executed by the one or more processors, the processor-executable instructions configure the system to perform acts comprising: receiving a worksite plan, the worksite plan including a boundary of a worksite at which a machine is to perform a task, at least one worksite condition parameter associated with the worksite, and information about the task to be performed by the at least one machine at the worksite. The acts can also include receiving, from the one or more sensors, sensor data associated with the worksite, the sensor data comprising at least one of location data or image data, and based at least in part on the sensor data, generating a first signal indicating that the worksite has been visually inspected. The acts can also include receiving condition parameter data indicating that the at least one worksite condition parameter is satisfied. The acts can also include generating, for display on the computing device, a graphical user interface comprising a graphical representation of the worksite and a user interface element, and based on the first signal, the condition parameter data, and a user input indicative of a user interaction with the user interface element, generating a validation signal indicating that the worksite has been validated. The acts can also include transmitting the validation signal.

In yet another aspect of the present disclosure, non-transitory computer-readable media store instructions that, when executed by one or more processors, perform actions including receiving a worksite plan, the worksite plan including a boundary of a worksite at which a machine is to perform a task, at least one worksite condition parameter associated with the worksite, and information about the task to be performed by the at least one machine at the worksite. The actions can also include receiving, from one or more sensors, sensor data associated with the worksite, the sensor data comprising at least one of location data or image data, and, based at least in part on the sensor data, generating a first signal indicating that the worksite has been visually inspected. The actions can also include generating, for display on the computing device, a graphical user interface comprising a graphical representation of the worksite and a user interface element, and receiving condition parameter data indicating that the at least one worksite condition parameter is satisfied. The actions can also include, based on the first signal, the condition parameter data, and a user input indicative of a user interaction with the user interface element, generating a validation signal indicating that the worksite has been validated, and transmitting the validation signal.

DETAILED DESCRIPTION

This disclosure generally relates to the sensing, coordination, and/or control of machines and personnel to increase safety and reduce incidents, such as accidents or injuries, in a geographical area, such as a worksite. In implementations, the systems and techniques described herein can be used in connection with validating a worksite in a manner that allows for the performance of machine-based tasked autonomously, semi-autonomously, and/or via remote operation. Wherever possible, the same reference numbers will be used through the drawings to refer to the same or like features.

Figure 1:
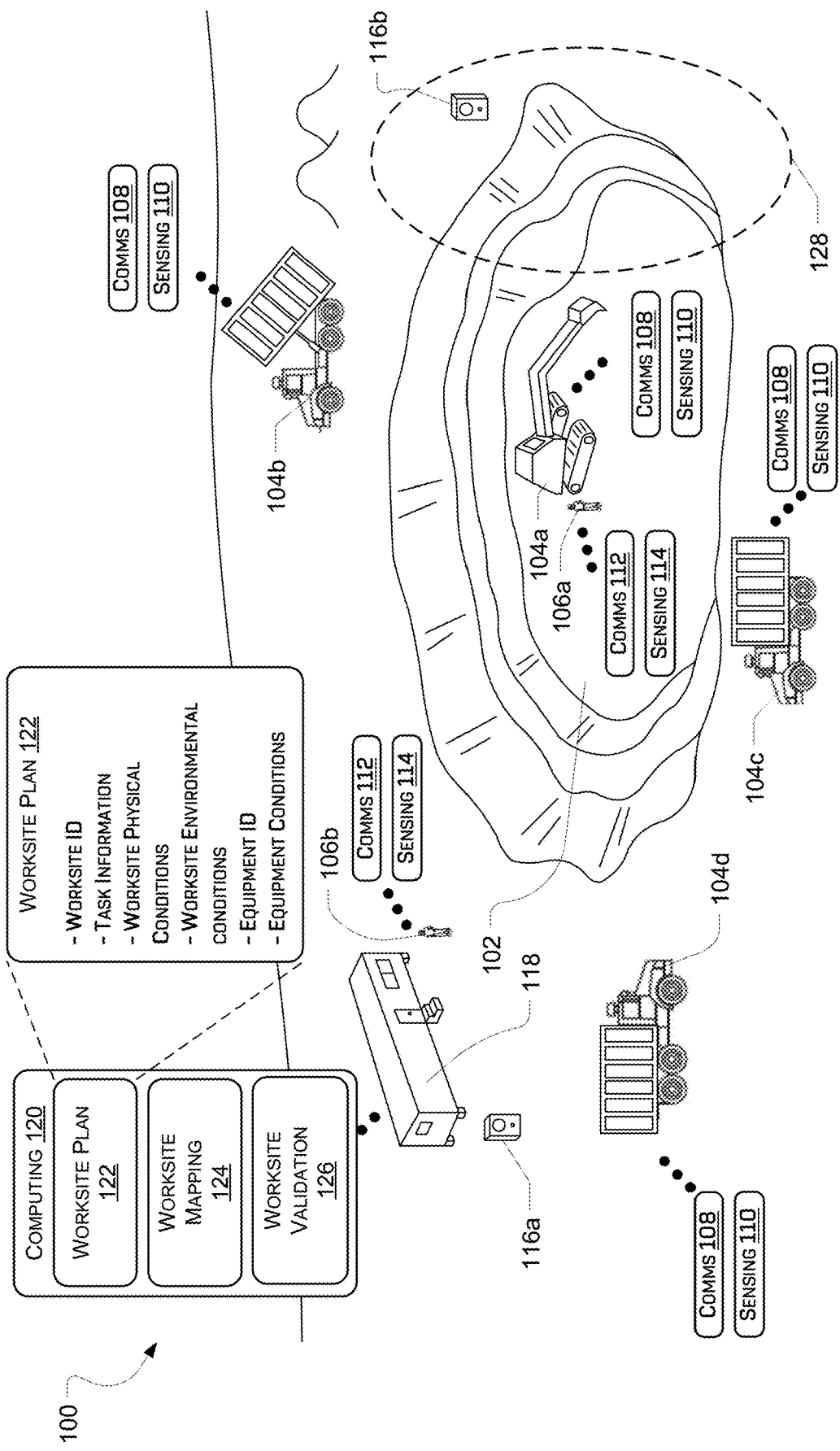
FIG. 1 is a perspective view of an environment in which jobs are to be performed in accordance with an example embodiment of the present disclosure.

Referring to FIG. 1, an example environment 100 may be a mining location at which a number of operations are being performed. For example, the environment 100 may include an open-pit mine 102 from which ore and/or other materials may be extracted. Additional or alternative operations (not illustrated) performed at the site may include, but are not limited to, tunnel mining, blasting, and/or other mining or landscaping operations. Although such operations are particularly suited to mining, aspects of this disclosure may apply to geographic areas and environments other than a mining site. For example, and without limitation, aspects described herein may be applicable to many geographic locales at which coordinated activities are carried out. In some instances, the environment 100 may include aspects of a paving site, an industrial site, a factory floor, a building construction site, a road construction site, a quarry, a building, a city, or the like. Moreover, features of the environment 100 may change over time, e.g., as the environment 100 develops from mining, digging, grading, and/or other machine-based actions and/or because of erosion or other natural changes.

A number of machines may be present in the environment 100. For instance, FIG. 1 illustrates an excavator 104a in the open pit mine 102 and trucks 104b, 104c, 104d performing various hauling and dumping operations throughout the worksite 100. The excavator 104a and the trucks 104b-104d are only examples. Other machines, including but not limited to earth-moving machines, e.g., wheel loaders, dump trucks, backhoes, bulldozers, or material handlers, tankers, e.g., for carrying water or fuel, over-the-road vehicles, work machines, e.g., pavers or compactors, or the like may additionally or alternatively be present in the environment 100. Moreover, other locations or types of environments may require different machines, and techniques described herein may be applicable to these different locations/environments. As used herein, the term "machine" may refer to any type of machine that performs relevant operation associated with a given industry such as mining, construction, farming, transportation, oil and gas, manufacturing, or any other industry. Throughout this disclosure, one or more machines, including but not limited to the excavator 104a and/or the trucks 104b, 104c, 104d, may be referred to as "the machines 104."

In some implementations, tasks, jobs, or operations performed in the environment 100 may be substantially or completely autonomous. However, in the illustrated embodiment, people or personnel 106a, 106b may also be present. For example, the personnel 106a may be a worker or operator in the open-pit mine 102 and the personnel 106b may be a supervisor or foreman overseeing operations in the environment 100. Although only two personnel 106-1, 106-2 are illustrated, additional personnel may also be present in the environment 100. Moreover, although example tasks or jobs may be ascribed to the personnel 106 for purposes of examples, herein, such are examples only. In implementations described herein, personnel may be performing manual labor, or may be performing operations on the machines 104, such as overseeing operations the machines 104, visually inspecting a worksite in the environment 100, e.g., to identify obstacles and/or validate a work plan, as detailed further herein, and/or performing other tasks.

One or more of the machines 104 may be configured with or otherwise have access to one or more communication components 108 and/or one or more sensing components 110. Moreover, one or more of the personnel may have an accompanying one or more communication components 112 and/or one or more sensing components 114. For example, the communication components 108, 112 may include a transmitter/receiver, including an antenna, to facilitate wireless communication, e.g., via radio frequency (RF) signals, via a wireless network, such as a local area network (LAN) or a wide-area network (WAN), or any other communication protocol. The communication components 108 may be configured to communicate with a central hub, e.g., at a fixed location, with the central hub being configured to receive all or substantially all communications and route the communications as appropriate. In other implementations, the communication components 108 may be configured to communicate directly with each other, e.g., via a distributed network. Hybrid networks and/or different communication networks and protocols may alternatively be used; this disclosure is not dependent upon a single arrangement, technology or protocol. The communication components 108, 112 may generally include any devices with which a human user, e.g., the personnel 106, machine operators, and/or the like, can interact. For instance, the communication components 108, 112 can include an input device, such as a touchscreen or keypad, a speaker and/or a microphone to facilitate verbal communication, and/or other communication technologies. By way of non-limiting example, the communication components 108 may include a touch screen in the one of the machines 104, one or more radios accessible in the one of the machines 104, a speaker system in the one of the machines 104, one or more microphones disposed in the one of the machines 104, or the like. Moreover, the communication components 112 may include a mobile phone, a tablet device, a radio, a headset, or other electronic device associated with the personnel 106 that facilitates communication between the personnel 106 and a remote system, a remote device, or person at a remote location.

The sensing components 110 may be any type of and any number of sensor modalities affixed to or otherwise associated with the machines 104 and the sensing components 114 may include any number of sensor modalities associated with the personnel 106 or the communications components 112 accompanying the personnel 106. By way of non-limiting example, the sensing components 110 and/or the sensing components 114 may include location sensors (e.g., GPS, compass, etc.), inertial sensors (e.g., inertial measurement units, accelerometers, magnetometers, gyroscopes, etc.), cameras (e.g., imaging sensors, range-finding sensors, RGB, UV, IR, intensity, depth, etc.), microphones, wheel encoders, environment sensors (e.g., temperature sensors, humidity sensors, light sensors, pressure sensors, etc.), LIDAR sensors, RADAR sensors, ultrasonic transducers, and/or SONAR sensors. The sensing components 110 may be configured to sense conditions external to or internal of (e.g. in a cab of) the machines 104 with which they are associated. By way of non-limiting example, the sensing components 110 may include cameras trained on an exterior of the machine, e.g., to record video and/or images of a portion of the external environment 100 around the one of the machines 104 and/or cameras configured to record an internal environment of the one of the machines 104, e.g., to record video and/or images of an operator of the one of the machines 104. In addition to different types of sensors, the sensing components 110 may also include multiple sensors of the same type. For example, a plurality of microphones, cameras, or LiDAR sensors may be disposed at different locations on the one of the machines 104, e.g., to provide information about different aspects of the external environment 100 of the one of the machines 104, and in some instances up to a 360-degree view around the one of the machines 104.

In some examples, the sensing components 114 may be integrated into one or more electronic devices associated with the personnel 106, including but not limited to the communications component 112, a device worn by the personnel 106, e.g. a head-mounted device, a wrist-mounted device, or the like, or a device carried by the personnel, e.g., a smart phone, a radio, a tablet, a fob, or the like. In at least some examples of this disclosure, the personnel 106 may carry or otherwise have associated therewith a portable electronic device, such as a mobile phone, a tablet, or the like. The electronic device may include an interactive display with which the personnel may interact, e.g., via touchscreen or other input device, e.g., as a part of the communication component 112, and may include one or more sensors, e.g., location sensors, imaging sensors, or the like to capture information about portions of the environment 100, e.g., as a part of the sensing component 114.

Moreover, in addition to the sensing components 110 associated with the machines 104 and the sensing components 114 associated with the personnel 106, additional sensors may also be disposed in the environment 100. For example, additional sensors 116a, 116b (collectively, and when referring to additional and/or alternative sensors not associated with one of the machines 104 and/or personnel 106, the "additional sensors 116" or "sensors 116") also are illustrated in FIG. 1. For example, the sensors 116 may include one or more sensor modalities, e.g., a motion sensor, a camera, a position sensor, a microphone, a LiDAR sensor, a radar sensor, and/or the like, to surveille conditions in the environment 100. In the example implementation of FIG. 1, the additional sensor 116a may be associated with a workstation 118, e.g., to sense conditions at or proximate the workstation, and the additional sensor 116b may be arranged proximate the open-pit mine 102, e.g., to sense conditions at or proximate the mine 102. In some examples, the sensors 116 can be placed at locations throughout the worksite 100 to provide additional information about aspects of the worksite 100. In some implementations, the sensors 116 may be disposed to sense conditions at locations that may be of importance and/or at which may be more-likely to be performed. The additional sensors 116 may be associated with other elements, including potentially hazardous elements, in the environment 100. By way of non-limiting example, the additional sensors 116 may be associated with high voltage sources, transformers, pressurized containers, fuel storage, radiation sources, hazard material sites, chemical storage, or the like.

As noted above, the worksite 100 may also include a workstation 118, which may be a room, building, vehicle, or the like, in which one or more of the personnel 108 may be situated. For example, the workstation 118 may contain one or more offices in which a supervisor, a foreman, and/or different personnel may be stationed. In some implementations, the workstation 118 may act as a hub, for example, serving as a location at which the various machines and personnel are directed or otherwise controlled. To this end, the workstation 118 may include one or more computing systems 120 configured to implement processes described herein. For instance, the computing system(s) 120 may be configured to receive information from one or more of the sensing components 110, 114 and/or the sensors 116. The computing system(s) 120 may also be configured to receive information from and/or transmit information to the machines 104 and/or the personnel 106, e.g., via the communication components 108, 112. Although FIG. 1 illustrates the computing system(s) 120 as associated with the workstation 118, aspects of the computing system(s) 120 may be carried out other than at the workstation 118, and in some instances may be carried out other than in the environment. By way of non-limiting example, the computing system(s) 120 may be remote computing systems, cloud-based computing systems, or other computing systems.

As described, several jobs and/or tasks may be performed in the environment 100. In some examples, it may be desirable to control machines to perform those tasks remotely, e.g., with an operator remote from the cab of one of the machines 104, and/or to perform those tasks with machines functioning with some level of autonomy. However, merely instructing a remote operator to control one of the machines 104 to perform the task and/or causing an autonomous one of the machines 104 to perform the task can be unsafe or otherwise ineffective if the environment 100 or a portion thereof is not suitable for performing the task. As described further herein, in implementations of this disclosure, the computing system(s) 120 may receive data from the sensing components 110, 114 and/or the sensors 116, to validate areas of the environment 100, e.g., based on determining that certain conditions are met for a portion of the environment 100, and authorize additional action(s) in those areas. In a specific example described further herein, the computing system(s) 120 may be configured to automatically validate a worksite 128 as a prerequisite to performing autonomous, semi-autonomous, and/or remote-controlled work at a worksite 128.

In more detail, FIG. 1 schematically illustrates that the computing system(s) 120 may include a worksite plan 122, a worksite mapping component 124, and a worksite validation component 126. In examples described herein, the worksite plan 122 may be a plan to perform one or more tasks or operations in the environment 100. As illustrated in FIG. 1, the worksite plan 122 can include information including a worksite identification, task information, worksite physical conditions, worksite environmental conditions, an equipment identification, and/or equipment conditions. For instance, the worksite identification can be a location or region within the environment 100 at which a job or task is to be performed. In an example detailed below, for instance, the worksite identification can identify a perimeter of a worksite 128. The task information can include an identification of the job to be undertaken. For example, the task information can identify material to be excavated, hauled, moved, or the like, an amount of material to be excavated, hauled, moved, or the like, and/or other aspects of the task. The task information can also include locations from which the material is to be removed (e.g., within the worksite), locations to which material is to be moved (e.g., within or remote from the worksite). The worksite physical conditions can include information about physical parameters of the worksite. Such parameters can include ground and/or material conditions necessary for completing the task, an identification of obstacles (including physical obstacles, people, or the like) that would prohibit performing the task, and/or an identification of physical conditions that must be present to perform the task. The worksite environmental conditions can include weather-related conditions, which can include conditions in which the task can be safely performed and/or conditions that would prohibit performing the task. Without limitation, the weather-related conditions can include information about temperature, humidity, wind, precipitation, or the like. The equipment identification can be an identification of a machine or machines that may be required to perform the task. The equipment conditions can include information about a relative health of a machine (e.g., fuel, oil, maintenance) or a portion of the machine (e.g., a tool or implement associated with the machine(s) or a subsystem, e.g., braking system, control system, of the machine). The foregoing conditions and attributes of the worksite plan 122 are for example only; more, fewer, and/or different conditions and/or information that may impact the performance of work in the environment 100.

In examples, the worksite plan 122 may be uploaded to or otherwise accessible by the computing system(s) 120. In other examples, the computing system(s) 120 may facilitate generation of the worksite plan 122, e.g., via one or more user interfaces facilitating user interactions to define parameters associated with the worksite plan 122. By way of non-limiting example, the worksite plan 122 can include information about one or more tasks to be performed in the environment and one or more conditions that must be present to perform such task(s). For instance, the worksite plan 122 can be generated by a foreman, site administrator, other of the personnel 106, one or more remote individuals, by a computer process identifying needs for completing a job in the environment 100, or otherwise. As used herein, a "condition" may refer to an attribute, a state, or a fact about a machine, personnel and/or the worksite generally.

As illustrated in FIG. 1, the computing system(s) 120 can also include the worksite mapping component 124. The worksite mapping component 124 may include functionality that determines regions or sub-regions of the environment 100, e.g., as defined or required by the worksite plan 122, and generates or causes to be generated visual depictions of the environment and/or those regions. For instance, such visual depictions can be displayed on a display device, e.g., via a graphical user interface. For instance, the worksite mapping component 124 may store or access maps of the environment. In at least some examples, the maps can include a two-dimensional and/or a three-dimensional representation of the environment 100. The worksite mapping component 124 may determine location information from the worksite plan 122, e.g., location information identifying the worksite 128 within the environment 100. In examples described herein, the worksite may be a region of the environment 100 at which one or more specific tasks are to be performed. The worksite mapping component 124 may also include functionality to designate a portion of the environment 100 as the worksite 128, e.g., from the worksite plan 122. For example, the worksite mapping component 124 may receive or determine coordinates, e.g., latitude/longitude, local coordinates, or the like, representative of an area within the environment 100 and identify the area in map data of the environment. As detailed further herein, the worksite mapping component 124 may also generate a map for display via a graphical user interface. In addition to including a graphical representation of the environment 100 in whole or in part, the map can also present an indication of the region(s) identified by the worksite plan 122.

The computing system(s) 120 may also include the worksite validation component 126. As described further herein, the worksite validation component 126 may include functionality to determine that a worksite is ready for performance of a task or tasks, e.g., to validate the worksite. In examples described herein, the worksite validation component 126 can receive location information from a device and confirm, based on the location information, that a visual inspection of the worksite has been performed. For instance, by determining that a device has been located around an entire perimeter of a worksite, at one or more predetermined locations associated with the worksite, or at one or more other locations, the worksite validation component 126 can determine that personnel associated with the device has sufficiently inspected the worksite. In examples, the worksite validation component 126 can receive position information from a position sensor, e.g., a GPS sensor, located on the device, e.g., as one of the sensing components 110, 114. Moreover, the worksite validation component 126 can also, or alternatively, receive a validation signal from a device associated with personnel proximate the worksite. For instance, the personnel may interact with the device, e.g., via a touchscreen or similar input device, to confirm that the worksite has been visually inspected, and such confirmation may cause a signal indicative of the validation to be sent to, and received by, the worksite validation component 126. In some examples, a visual inspection may be crucial for ensuring that the worksite is prepared for the task(s) required by the worksite plan. For instance, the visual inspection can ensure the presence or absence of one or more conditions. As used herein, a "condition" may refer to an attribute, a state, or a fact about a machine, and/or personnel present at the worksite. Further, the condition may indicate attributes about the worksite such as environmental conditions (e.g., temperature, wind, precipitation), physical conditions (e.g., surface grade, surface composition), and/or information about objects at the site (e.g., objects that would prevent performing a task and/or that may be required for performing the task). In this context, conditions may also denote prerequisite conditions that are required to be met before for a task can be performed at the worksite, and may constitute a presence or an absence of any object(s) located at the worksite, the attribute(s) and state(s) of the objects present at the worksite, or the indication of the attributes of the personnel present at the worksite and the like.

A non-limiting, example implementation of the present disclosure now will be described with reference to FIG. 1. As noted above, the environment 100 may include an open pit mine 102 along with additional features and areas. For example, one or more tasks at the environment 100 may include removing material from the open pit mine 102 e.g., using the excavator 104a, and moving the removed material to a remote location, such as using the haul trucks 104b, 104c, 104d. An instance of the worksite plan 122 may include a number of objectives or tasks to be performed at the environment 100, e.g., to attain some goal, such as removal of some amount of material from the open pit mine 102. In this example, the worksite plan 122 may include instructions to begin an earth removing operation in a new portion of the open pit mine 102. For example, the worksite plan 122 can identify the worksite 128 as a region of the environment 100 in which this new excavating task is to be performed. The worksite 128 is set off by a dashed ellipse in FIG. 1. In some examples, the worksite 128 may be identified in the worksite plan 122 as a next or additional portion of the mine 102 at which materials are to be excavated and/or removed. The worksite plan 122 may also identify the excavator 104a as being the appropriate machine to perform the removal task at the worksite 128. Assume also, for purposes of this example, that the excavator 104a is configured to function autonomously, e.g., without operator interaction. While the excavator 104a may be autonomous in this example, in other examples the excavator 104a may be semi-autonomous, e.g., performing some functions without operator interaction, or may be remotely-operated, e.g., by an operator other than in a cab associated with the excavator 104a and/or an operator located remotely from the open pit mine 102.

In some implementations, the bounds of the worksite 128 may be identified without a line of sight to the worksite 128. For example, the worksite plan 122 may have been formulated at commencement of a lengthy mining operation and the expansion of operation into the worksite 128 may be a next step in the worksite plan. In this example, the worksite 128 may be assigned without a line of sight to the worksite 128. In some implementations, based on this NLOS assignment, the excavator 104a could be instructed to begin an excavating or extraction operation at the worksite 128. However, because the assignment may have been made without a line of sight and the excavator 104a may be without an operator, intervening events may have occurred or conditions may be present at (or absent from) the worksite 128 that hinder performance of the task.

Accordingly, techniques described herein may be used to validate the worksite 128 prior to the excavator 104a beginning the task(s) required by the worksite plan 122. By way of non-limiting examples, it may be essential that the worksite 128 include, or be free from, certain conditions or attributes. In this example, the worksite plan 122 may require (i) that the worksite 128 be free of large obstacles, e.g., boulders, machines, trees, or other obstacles that could interfere with travel and or operation of the excavator 104a, (ii) that the ground in the worksite 128 be free of large holes, drop-offs, and certain, e.g., too loose or muddy, soil conditions, (iii) that the grade of the area on which the excavator 104a will be operating is acceptable for use of the excavator, and (iv) that the worksite 128 is free of operating personnel, service personnel, and any additional machines. Of course, these conditions are listed just as an example, as the worksite plan 122 may include fewer, additional, or alternative conditions that may lead to hindrance in performance of a worksite task.

In the example, the worksite mapping component 124 can determine the worksite 128, e.g., from the worksite plan 122, and determine the boundary of the worksite 128 within the environment 100. For example, the worksite plan 122 may identify only that work is to be completed at an eastern end of the open pit mine 102, and such work will include removing a predetermined amount of material from the open pit mine 102. Based on this information, the worksite mapping component 124 can determine an extent and/or size of the worksite 128. Alternatively, the worksite plan 122 may dictate an amount or size by which the open pit mine 102 is to be expanded. The worksite mapping component 124 can include functionality to then determine the extent of the worksite 128 based on this information. Without limitation, the worksite 128 may be sized based on parameters defined by the worksite plan 122, using heuristics, or otherwise, and the worksite mapping component 124 can determine a boundary of the worksite 128. Also in examples, the boundary of the worksite 128 may be pre-defined, e.g., by personnel, such as a foreman, site administrator, or the like. In at least some examples, the worksite mapping component 124 can include functionality to generate a map of the environment 100 for display to personnel, and allow such personnel to input boundaries defining the worksite 128, e.g., by interacting with a touchscreen or the like. The worksite mapping component 124 may also include functionality to determine points along the boundary of the worksite 128, as described further herein. For example, predetermined positions along the boundary of the worksite 128 and/or within the worksite 128 may be identified by the worksite mapping component 124 as points or locations from which personnel can perform a visual inspection of the worksite 128.

In this example, once the metes and bounds of the worksite 128 are established or mapped by the worksite mapping component 124, the worksite validation component 126 can receive information from one or more sensors or sources to validate that the excavator 104a can perform the tasks enumerated by the worksite plan 122. For example, the worksite validation component 126 can receive information from communications components 108, 112 and/or from sensing components 110, 114, 116 about conditions of the environment 100 at or proximate the worksite 128. By way of non-limiting example, the personnel 106a, as personnel closest to the worksite 128, may be tasked with performing a visual inspection of the worksite 128, e.g., to ensure that conditions are as required for performance of the task(s). In this example, the personnel 106a may have a portable device that includes one or both of the communication component 112 and/or the sensing component 114. For instance, the sensing component 114 can include a GPS or other position sensor that sends position information, e.g., via the communication component 112, to the computing system(s) 120. Upon receiving the position information, for example, the worksite validation component 126 can determine that the personnel has traversed the worksite 128 e.g., by comparing the position information to one or more locations designated by the worksite mapping component 124. For example, such one or more locations may include positions along the perimeter of the worksite 128 and/or position(s) within the worksite 128.

In this example, the position information generated by the sensing component 114 associated with the personnel 106a can be used to determine that the physical location(s) of the personnel 106a are such that the personnel 106a has been in a position to perform a visual inspection of the worksite 128. The worksite validation component 126 can also include additional functionality to further confirm validation of the worksite 128. For example, the worksite validation component 126 may cause a user interface to be presented to the personnel 106a, e.g., via a display of a device including the communications component 112 and/or the sensing component 114. For instance, the user interface may be configured to receive an input from the personnel 106a confirming validation of the worksite 128. For example, the personnel 106a may be provided with a checklist or similar list of necessary conditions, e.g., the conditions (i)-(iv) described above, and the personnel 106a may confirm such conditions as present/absent.

Accordingly, the computing system(s) 120 may facilitate validation of a worksite prior to performing a task or job at the worksite. In some examples, the computing system(s) 120 can provide improved and/or safer outcomes by ensuring that the worksite 128 is suitable for performing the new excavation task before authorizing commencement of the task. Of course, the foregoing example is for illustration only. Additional examples, details, and modifications are provided further herein.

Figure 2:
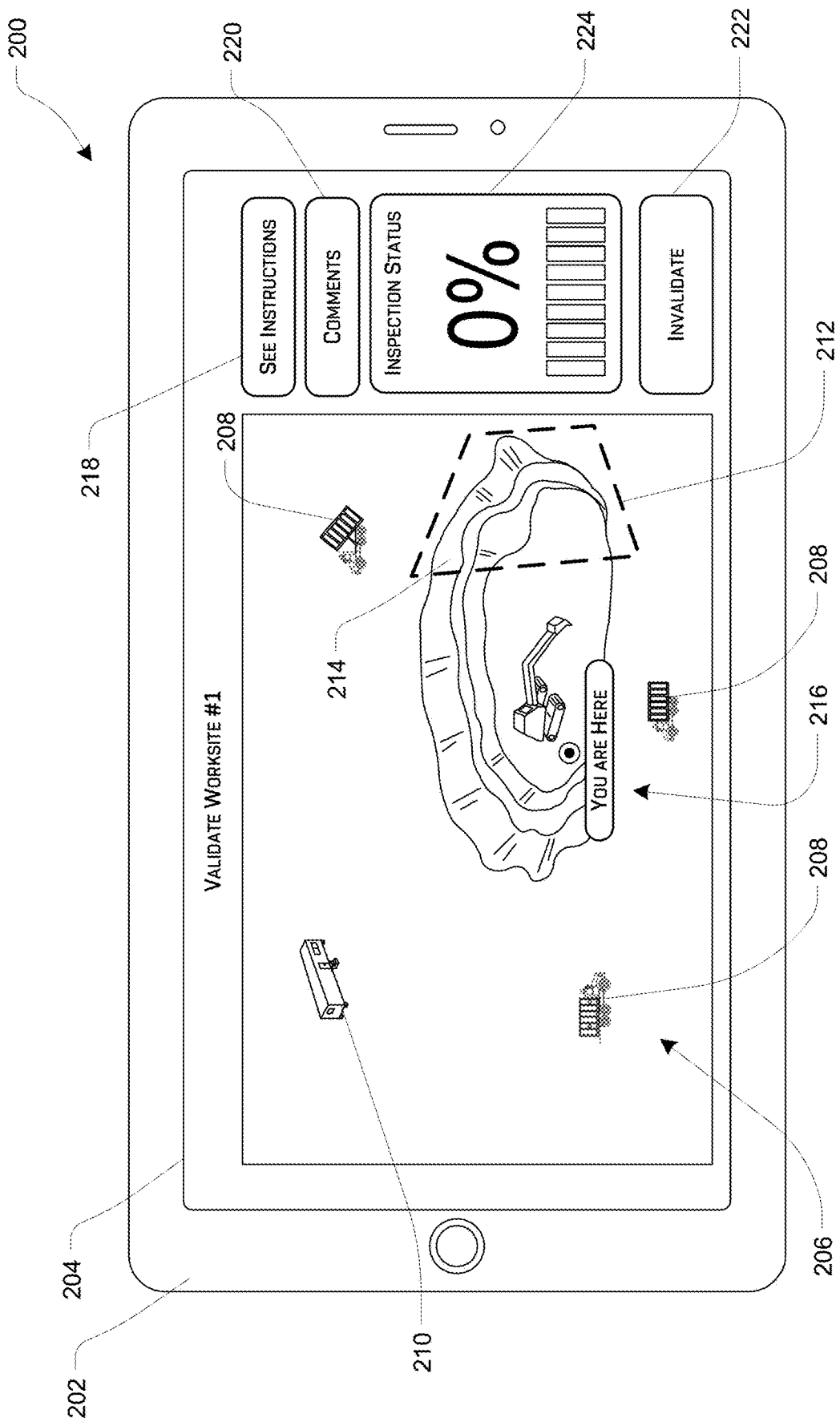
FIG. 2 is a schematic representation of a graphical user interface including a graphical representation of the environment and identifying a specific worksite in accordance with an example embodiment of the present disclosure.

FIG. 2 is a schematic representation of an example graphical user interface 200. More specifically, FIG. 2 illustrates a user device 202 having a display 204. The user device 202 is illustrated as a handheld device, such as a tablet device, although in other implementations, the user device may be any number of electronic devices, e.g., a desktop computer, a laptop computer, a smart phone, or the like, including a display and facilitating user interaction with the display 204. The display 204 is configured to display or otherwise render the graphical user interface 200. In the example illustrated, the graphical user interface 200 includes a map 206 generally including features of the environment 100. For example, the map 206 may illustrate topographical features such as of the open pit mine 102. The map 206 may also include graphical representations including but not limited to machine representations 208 (e.g., of the machines 104) and/or building representations 210 (e.g., of the work station 118). Although not shown in FIG. 2, the map 206 may graphically depict any additional or other features of the worksite 102. For example, the map 206 may include graphical depictions of personnel at the worksite (e.g., the personnel 106), of sensing devices located at the worksite (e.g., representations of the sensing device(s) 116), other topographical features, such as roads, elevation changes, bodies of water, or the like, and any other structures or features in or near the environment 100.

As also illustrated in FIG. 2, the graphical user interface 200 can include a graphical worksite depiction 212. The graphical worksite depiction 212 can be a depiction of a worksite 214 to be validated. For example, the worksite 214 may be the worksite 128 depicted in FIG. 1, and discussed further above. In the example graphical user interface 200, the graphical worksite depiction 212 is a dashed-line representation of a perimeter of the worksite 214, although in alternative implementations other representations may be used for the graphical worksite depiction 212. As detailed further herein, the graphical worksite depiction 212 provides a visual indication to personnel associated with the user device 202 of a worksite to be validated. The extents of the graphical worksite depiction 212 can be defined by the worksite plan 120 or determined, e.g., by the worksite mapping component 122, based at least in part on the worksite plan 120. Moreover, although the graphical worksite depiction 212 is illustrated as a quadrilateral, other shapes may be used, including but not limited to the elliptical shape used to demonstrate the worksite 128 in FIG. 1. Also in examples, instead of a representation of a continuous perimeter, the graphical worksite depiction 212 may be visualized as a number of points, landmarks, or locations. In some examples, the point locations may be generally aligned along the perimeter of the worksite 214, although other examples may include points other than along a perimeter. By way of nonlimiting example, one or more points inside the perimeter of the worksite 214 may be presented, in addition to or as an alternative to the perimeter. For instance, larger worksites may require more than a traversal of the perimeter to complete a visual inspection. In the example used in FIG. 1, a point may be provided at a base of the wall of the open pit mine 102, or other locations within the mine 102. Other example implementations will be appreciated by those having ordinary skill in the art with the benefit of this disclosure.

As also illustrated, the graphical user interface 200 can include a graphical current location depiction 216. In the illustrated example, the graphical current location depiction 216 is illustrated by two concentric circles and the text "you are here." In other implementations, the graphical current location depiction 216 can be otherwise presented on the graphical user interface 200, including with the use of one or more of graphics, text, animations, or the like. As will be appreciated, the graphical current location depiction 216 can illustrate a position of the device 202 on the map 206. The map 206 may be a representation of the environment 100 shown in FIG. 1, and in this example, the user device 202 may be associated with the personnel 106a, for example. In other examples, the graphical current location depiction 216 can illustrated a position of a person, e.g., the personnel 106a, for instance, based on position data obtained from a sensor worn by, carried by, or otherwise associated with the personnel 106a.

Figure 3:
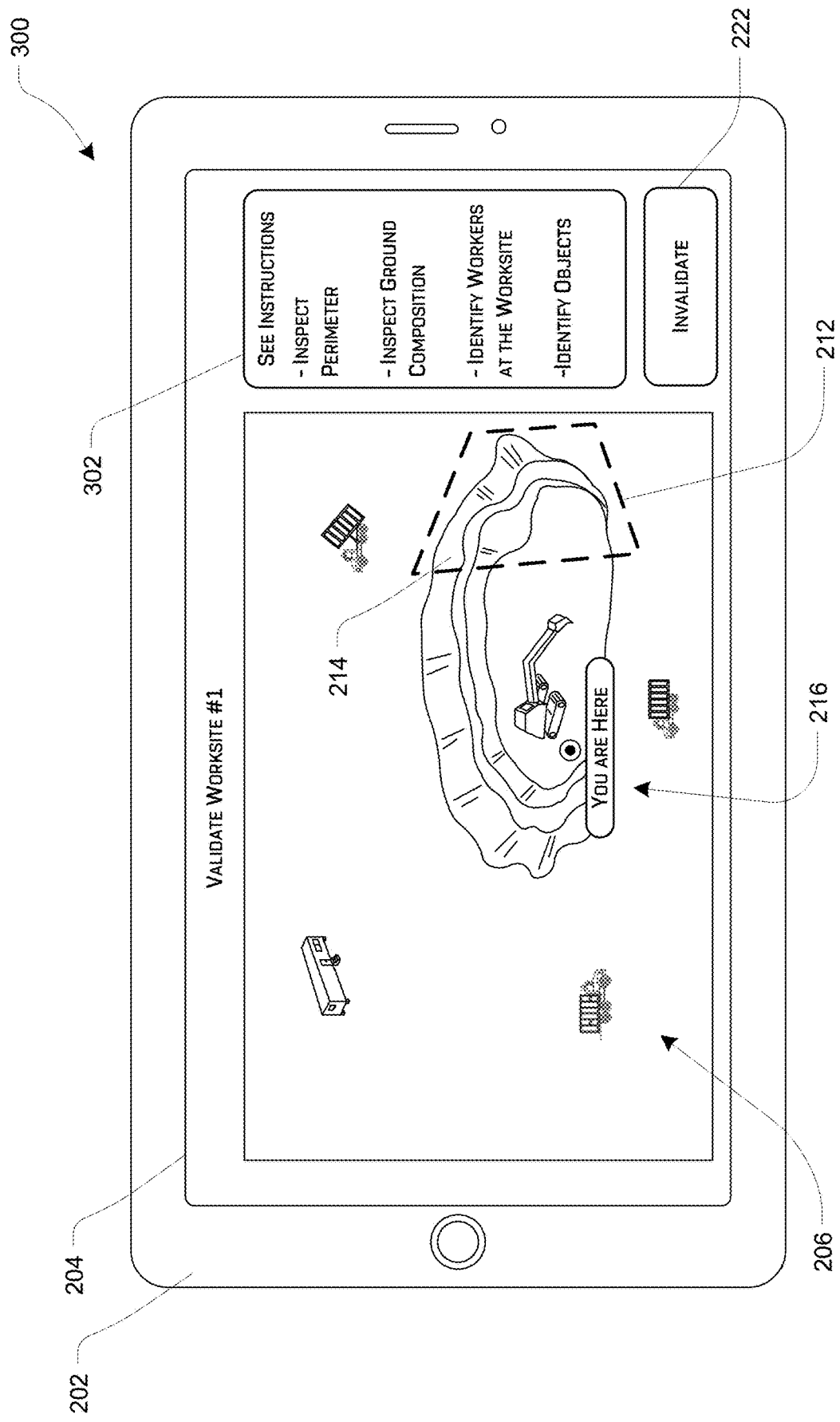
FIG. 3 is a schematic representation of another graphical user interface in accordance with another example embodiment of the present disclosure.

The graphical user interface 200 can also provide a user with instructions and context for validating the worksite 214. In this example, the graphical user interface 200 can include an indication of an overall task to be performed, e.g., the text "validate worksite #1," the map 206 of the environment 100 with the graphical worksite depiction 212 specifically identifying the worksite 214, and the graphical current location depiction 216 to orient the user relative to the worksite 214. The graphical user interface 200 may also include features that allow a user to interact with the graphical user interface 200. For example, and as illustrated in FIG. 2, the graphical user interface 200 may include user interface controls 218, 220, 222. In examples of this disclosure, the user interface controls 218, 220, 222 may be buttons or other designations on the display 204 of the device 202 with which a user may interact. For example, a user may interact with the user interface controls 218, 220, 222 by touching the display 204 at a position proximate a to-be-selected user interface control, by selecting one of the user interface controls 218, 220, 222 with a stylus or other selecting device associated with the user device 202, or otherwise. In the example of FIG. 2, a user may select the user interface control 218 to obtain additional information about requirements for validating the worksite. For example, selection of the user interface control 218 may cause the user device 202 to render an updated graphical user interface with additional information and enabling additional functionality pertaining to worksite validation. An example of an updated graphical user interface that may be presented in response to selection of the user interface control 218 is illustrated in FIG. 3, which will be described in more detail below.

The user may select or otherwise interact with the second user interface control 220 to enter comments. For example, selection of the second user interface control 220 may cause display of a dialog box or updated graphical user interface for a user to enter comments about the worksite 214. For example, selection of the user interface control 220 can present the user with an interface such as a keyboard or other similar input mechanism that allows for input of textual comments. In other examples, comments may be provided via an audio input, via speech to text technology, or other methods. In these examples, comments entered by the user may be transmitted to a remote computing system, such as the computing system(s) 120 described above in connection with FIG. 1. By way of nonlimiting example, comments can include records of attributes or conditions observed at or relating to the worksite 214.

The user may interact with the third user interface control 222 to indicate that the worksite 214 is not suitable for performing one or more tasks dictated by the worksite plan. As described herein, techniques may be used to determine whether a worksite, such as the worksite 214 is appropriate for performing one or more via autonomous, semi-autonomous, or remotely controlled machine-based tasks. The third user interface control 222 may allow a user to readily indicate that the worksite 214 is not suitable for the desired task. Although not illustrated, upon selecting the third user interface control 222, the graphical user interface 200 may be updated with a dialog box or the like requiring the user to confirm the "invalid" selection. Additionally, or alternatively, selection of the third user interface control 222 may prompt the user to enter comments including an indication of why the worksite 214 is not valid and/or cannot be validated.

As also illustrated in FIG. 2, the graphical user interface 200 may include one or more status indications associated with the validation of the worksite 214. One such option illustrated in FIG. 2 is an inspection status indicator option 224 when selected, causes display of a numerical representation of a percentage completion of the worksite inspection as well as a pictorial graphic of the same. The inspection status graphic 224 is for example only, and additional or different graphics may be used to indicate factors associated with the inspection status. In examples, validation of the worksite 214 may require that personnel traverse the perimeter of the worksite or otherwise travel to certain previously defined coordinates of the worksite 128 to facilitate a complete visual inspection of the worksite 128. The inspection status graphic 224 may indicate a progress associated with such travels relative to the worksite 214, as detailed further herein. With specific reference to FIG. 2, the user (or user device 202 is indicated as being away from the worksite 214 and, as such, the inspection status graphic 224 indicates that none of the worksite has been inspected, e.g., because the user (or user device) has not traveled to a position or positions at which a visual inspection can be carried out.

As noted above, the user may be able to access additional information about the worksite 214 and/or about requirements for validating the worksite 214, e.g., by selecting the user interface elements 218, 220, 222. For example, FIG. 3 illustrates an updated graphical user interface 300 that may be presented on the display 204 in response to a user selecting the first user interface element 218. In other examples, the graphical user interface 300 may be otherwise accessed, for example, by selecting one of the text "Validate Worksite #1," the representation of the worksite 214, the graphical worksite depiction 212, and/or some other or additional user interface element. In the illustrated example, and as noted above, the worksite 214 may correspond to the worksite 128 introduced above in connection with FIG. 1, and the purpose of the validation may be such that the excavator 104a can perform one or more tasks in the open pit mine 102 without an on-site or on-machine operator.

As illustrated in FIG. 3, the graphical user interface 300 accommodates an expanded instructions section 302. The instructions section 302 provides additional information about validation. For example, the instructions section 302 can provide the user with a list of conditions, objectives, or tasks that must be checked, accomplished, or otherwise performed to validate the worksite for the proposed task(s). In the illustrated example, the instructions require that the perimeter be inspected, the ground composition be inspected, that workers at the site be identified, and that objects at the worksite be identified. These enumerated tasks may generally correspond to, or be based at least in part on, the conditions (i)-(iv) from the example discussed above, although the tasks set forth in the instructions section 302 are for example only. More, fewer, and/or different tasks or instructions may be provided, and may be dictated at least in part by the worksite plan 122. In FIG. 3, the instructions section 320 is an expansion of the first user interface control 218 and the second user interface control 220 and the inspection status graphic 224 may be removed to accommodate the expansion. In other examples, additional, fewer, or different graphics may be removed from the graphical user interface 200 to accommodate presentation of the instructions section 302.

Figure 4:
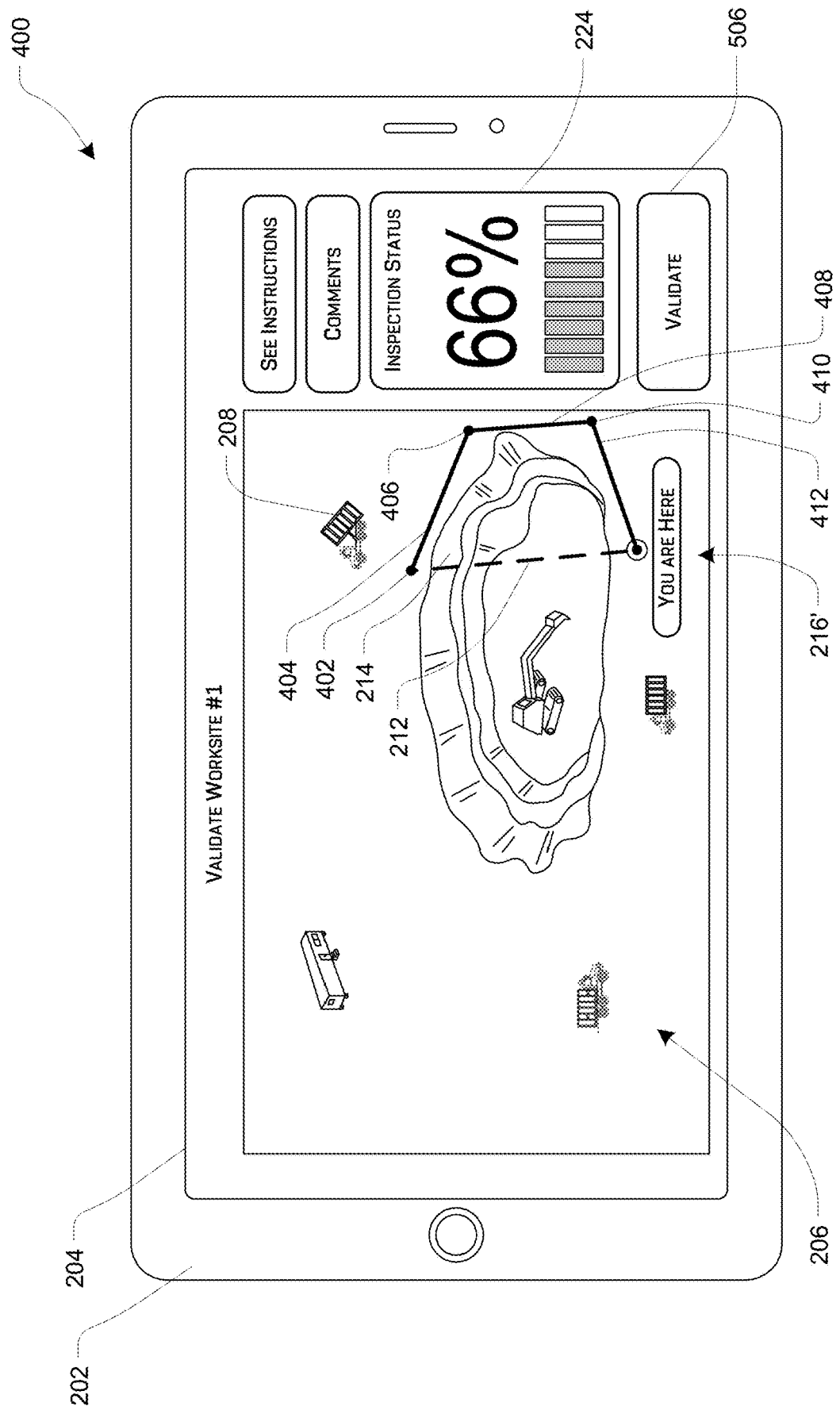
FIG. 4 is a schematic representation of another graphical user interface in accordance with another example embodiment of the present disclosure.

The instructions provided in the expanded instructions section 302 can provide a user, such as the personnel 106a, with a visual indication of each of the conditions required for the task identified by the worksite plan 122 to be executed. In some implementations, the instructions may include tasks to be performed by the personnel 106a, e.g., manually, and/or tasks to be automatically performed via sensors using computer-based automation techniques. For instance, the last entry in the expanded instructions section 302 is "identify objects." To complete this task, the personnel 106a may be tasked with determining whether there are objects within the worksite 214 that would prevent the excavator from performing the required tasks. If such objects are present, e.g., are visually identified by the personnel 106a as s/he visually inspects the site, the personnel 106a may interact with the third user interface control 222, e.g., to invalidate the worksite. In other implementations, the personnel 106a may be required to capture images of the worksite, and such images may be processed, e.g., using feature recognition techniques, to determine and identify objects and people present at the worksite. In this implementation, the user may be notified of the cancellation of the desired tasks on account of the presence of objects and people on the worksite According to techniques of this disclosure, computer-implemented techniques may be used to confirm that personnel has, in fact, inspected the worksite 214. For example, the first item listed in the expanded instructions section 302 is "inspect perimeter." Such instruction may indicate to the personnel 106a, or other user associated with the device 202, that s/he must traverse the perimeter of the worksite, with the perimeter indicated by the worksite representation 212. Because the graphical user interfaces 200, 300 illustrate the current location of the personnel, via the current location indicator 216, and the perimeter of the worksite 214, via the worksite depiction 212, the graphical user interfaces 200, 300 provide the user with a context of the current location, a destination location and directions for navigating from the source location to the destination location. Similarly, the implementation may present a map of worksite 214, not shown in FIG. 3, that can help inspection personnel to navigate within the worksite 214. FIG. 4 shows an updated example graphical user interface 400 in which the personnel has moved, e.g., to undertake a visual inspection of the worksite 214. In this example, the present location indication 216 has been updated to show that the device 202 is now located proximate the bottom left corner of the quadrilateral defining the worksite 214. As also illustrated, a portion of the perimeter of the worksite 214 is now shown in solid line. In this example, the personnel 106a, with the device 202, may have traveled from the location indicated in FIGS. 2 and 3 by the current location indicator 216, to a first position 402 proximate the top left corner of the worksite 214. From the first position 402, the user may have traversed along the line 404 to a second position 406 proximate the top right portion of the worksite 214. From the second position 406, the personnel may have traversed along the line 408 to a third position 410, and from the third position 410, the personnel may have travelled to the current position indicated by the current location indicator 216' along the line 412.

In addition to including the lines 404, 408, 412, e.g., as indications of positions at which the personnel has traveled to inspect the worksite 214, the graphical user interface 400 may also include updates to the inspection status graphic 224. For instance, and as illustrated, the inspection status graphic 224 may be updated to include numerically, visually, or otherwise on amount of the worksite 214 that has been traversed by the personnel. In this example, the numerical depiction, as well as the graphical representation below the numerical depiction, demonstrate that approximately two thirds, or 66% of the worksite 214 has been inspected. For instance, the percentage of validation may directly correspond to on amount of the perimeter that has been traversed by the personnel. In examples, the path taken by the personnel can be determined using sensors on the electronic device 202. By way of nonlimiting example, the electronic device 202 may include one or more position sensors, e.g., a GPS sensor, or the like, and position information may be used to track movement of the device 202, and therefore of the personnel. In the illustrated example, the path of the personnel is limited to illustrating the positions along the perimeter of the worksite 214. In examples, the device 202 may not exactly track the worksite perimeter indication 212. Stated differently, the personnel may not travel with the device 202 exactly along the outline depicted by the perimeter indication 212, but the location information generated by the location sensor(s) on the electronic device 202 may indicate that the device 202 is within some threshold distance to the perimeter, and thus confirm personnel was in at or in the vicinity of the perimeter. In some examples, the location data generated by the electric device 202 may be generated at some fixed interval, and an inference may be made as to a route taken between locations generated in successive readouts. In other examples, the worksite mapping component 124 may determine a number of discrete points along the perimeter of the worksite 214, and the location data may be compared to those positions. For instance, points may be associated with each of the positions 402, 406, and 410, and additional points may be determined between those positions. By way of nonlimiting example, the line 404 may be generated in response to confirming that the user device has been at three predetermined points between the position 402 in the position 406. When discrete points are used, as just described, the inspection status graphic 224 may be based on a number of points at which the user device 202 has been. In some examples, a position of the user device 202 within some radius of the point(s) may be sufficient to confirm that the device 202 has been located at the respective point.

Figure 5:
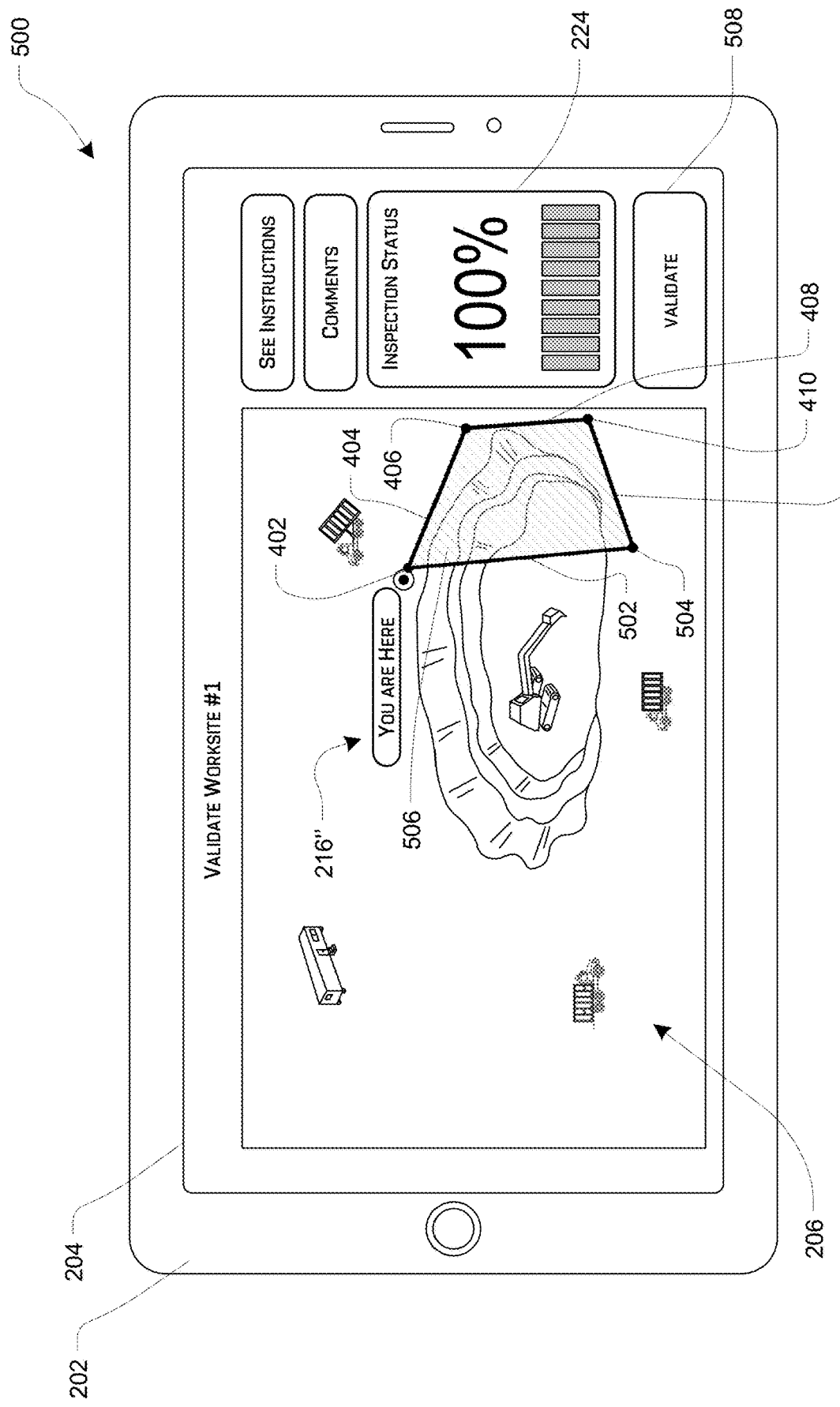
FIG. 5 is a schematic representation of another graphical user interface in accordance with another example embodiment of the present disclosure.

FIG. 5 illustrates yet another graphical user interface 500. Compared to the graphical user interface 400, the graphical user interface 500 indicates, as represented by the current location indicator 216", that the personnel, e.g., associated with the device 202, has now traveled to a location proximate the first position 402. For example, the electronic device 202 may have been moved generally along the line 502 from a position 504 to the first position 402. In this example, because the electronic device 202 has now traversed around the entirety of the perimeter of the worksite 214, the inspection status graphic 224 has been updated to show that 100-percent of the worksite has been inspected. In addition, the graphical user interface 500 may be updated to include a shaded region 506 showing that the entirety of the worksite 214 has been traversed. In some implementations, confirming that the personnel has been in a series of positions associated with the worksite 214, e.g., around the perimeter of the worksite 214, may be sufficient to confirm that the worksite 214 is validated for performing the task(s) associated with the worksite plan 122. However, as described further herein, additional steps may be taken, e.g., to confirm one or more conditions associated with the worksite 214, to complete validation.

Also in the example graphical user interface 500 illustrated in FIG. 5, a user interface control 508 may be presented. In the illustrated example, the user interface control 508 when selected may start the validation process for the worksite 114. In this example, the user may interact with, e.g., select, the user control 508 to perform additional tasks associated with validating the worksite. In at least some examples, selection of the validate user control 508 may cause the user device 202 to display an example graphical user interface 600 illustrated in FIG. 6.

Figure 6:
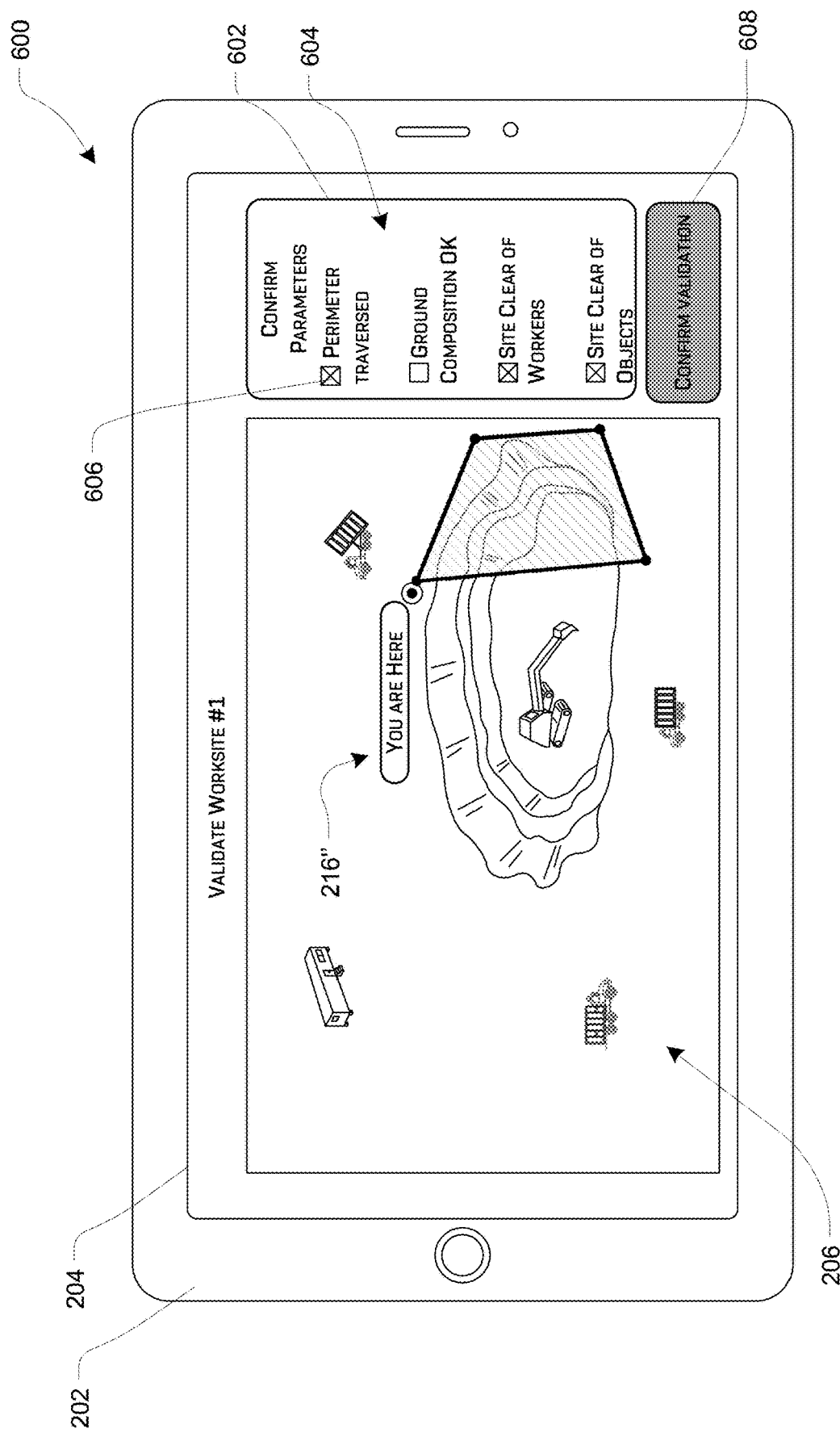
FIG. 6 is a schematic representation of another graphical user interface in accordance with another example embodiment of the present disclosure.

As illustrated in FIG. 6, the graphical user interface 600 includes several of the features of the graphical user interface 500, but also includes a confirm parameters user interface 602. Specifically, in this example, the confirm parameters user interface 602 includes a list 604 of parameters, conditions, or tasks required to validate the worksite 214. Moreover, individual conditions or tasks in the list 604 may have an associated selectable user control 606. In the example, the selectable user control 606 may toggle between a first state indicating that the condition is met or task is completed and a second state indicating that the condition is not met or the task is not yet completed. In the example, items in the list 604 generally correspond to the instructions presented in the graphical user interface 300. Specifically, and as detailed above, it may be necessary that a number of conditions be present (or absent) in order to validate a worksite for performing a task, e.g., from a worksite plan 122. Those conditions may be presented to a user via the graphical user interface 300, and the graphical user interface 600 may be configured to receive confirmation, e.g., via the selectable user controls 606, that such conditions have been met. In the illustrated example, the selectable user control 606 associated with the "perimeter traversed" entry in the list 604 may be automatically "checked" (or otherwise indicated as completed) upon the user completing navigation around the worksite 214, e.g. when the inspection is completed as described above. Also in this example, the site is confirmed to be clear of workers and clear of obstacles. For example, the "site clear of workers" and "site clear of objects" may have been manually confirmed by the user, e.g., while traversing the perimeter of the worksite 214. In examples, the user associated with the user device 202 may have visually confirmed that no workers and no objects are present at the site. The list 604 may also indicate to the user that s/he must still confirm that the ground composition is sufficient to execute the task.

The graphical user interface 600 also includes a "confirm validation" user control 608, which is grayed out in the illustrated example. For instance, the confirm validation user control 608 may be selectable by the user to complete the validation process only upon each of the items in the list 604 being indicated as completed, e.g., via the selectable user controls 606. Visually, the confirm validation user control 608 may be grayed out only until all tasks in the list 604 are indicated as complete. In some instances, selection of the confirm validation user control 608 can cause the user device 202 to generate and transmit a validation signal, e.g., to the computing system(s) 120, to confirm validation of the worksite. Such a signal may indicate to the computing system(s) 120 that the worksite 214 is ready for performance of the task(s) indicated by the worksite plan 122.

According to examples described in connection with the graphical user interfaces 200, 300, 400, 500, 600, the present disclosure describes a system by which a worksite 214 can be validated prior to executing one or more tasks at the worksite 214, e.g., in accordance with a worksite plan 122. Validation of the site can include generating a map 206 of the worksite 214 in a larger environment 100, e.g., using the worksite mapping component 124, and causing the map 206 to be presented on the user device 202. Sensor data, e.g., position data, can then be used to determine that the user device 202 has been transported around the worksite 214, indicating that the personnel has visually inspected the worksite 214. In addition to inferring that the personnel has inspected the worksite 214, other sensor data can also be used to confirm the inspection. By way of non-limiting example, the data generated by one or more of the sensors 110, 114, 118 may be received by the computing system(s) 120, such that the worksite validation component 126 can determine aspects of the validation. In some instances, the personnel 106a may use a camera associated with the user device 202 to capture image data, e.g., images and/or video, of the worksite 214. The worksite validation component 126 may include functionality to determine whether conditions are met at the site based on this image data. For instance, the worksite validation component 126 may include image processing functionality, e.g., feature recognition, capable of identifying people or objects at the worksite. Similarly, sensors proximate the worksite, such as the additional sensor 116b, can be used to provide image data, environmental data, or other data about conditions at or proximate the worksite 214.

Figure 7:
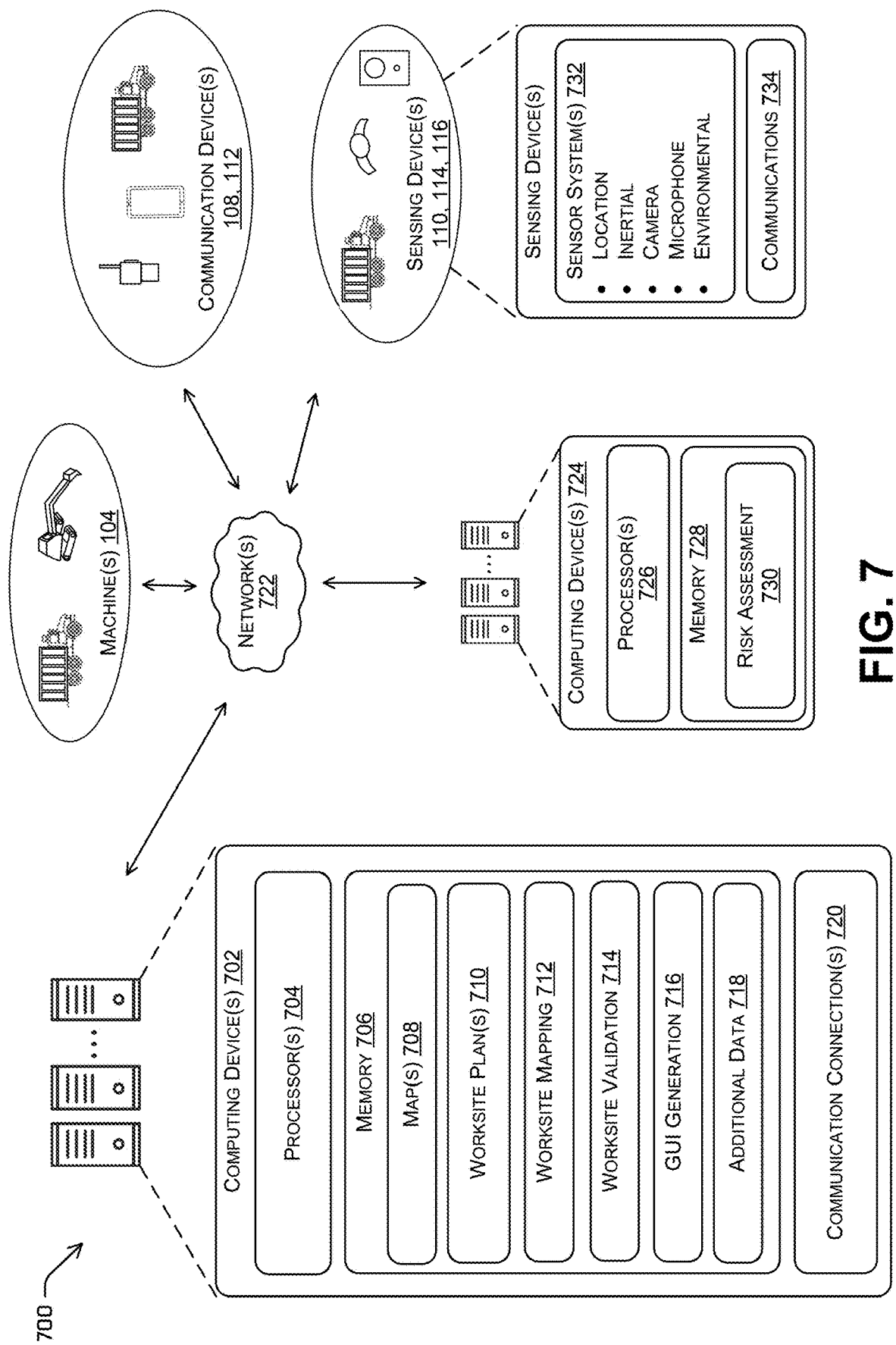
FIG. 7 is an example computing environment for validating a worksite in accordance with an example embodiment of the present disclosure.

FIG. 7 is a block diagram illustrating an example system 700 for worksite validation according to examples described herein. In at least one example, the system 700 can include one or more computing device(s) 702, which may be, or include, the computing system(s) 120 in some implementations. The computing device(s) 702 can include one or more processors 704 and memory 706 communicatively coupled with the processor(s) 704. In the illustrated example, the memory 706 of the computing device(s) 702 stores one or more maps 708, one or more worksite plans 710 (which may be or include the worksite plans 122), a worksite mapping system 712 (which may be or include the worksite mapping component 124), a worksite validation system 714 (which may be or include the worksite validation component 126), and a graphical user interface (GUI) generation system 716. Although these systems and components are illustrated, and will be described below, as separate components, functionality of the various systems may be attributed differently than discussed. Moreover, fewer or more systems and components may be utilized to perform the various functionalities described herein. Furthermore, though depicted in FIG. 7 as residing in memory 706 for illustrative purposes, it is contemplated that the map(s) 708, the worksite plan(s) 710, the worksite mapping system 712, the worksite validation system 714, and/or the GUI generation system 716 may additionally, or alternatively, be accessible to the computing device(s) 702 (e.g., stored on, or otherwise accessible by, memory remote from the computing device(s) 702).

In some examples, the maps 708 may include maps of environments at which jobs are to be performed, such as the environment 100. A map can be any number of data structures modeled in two dimensions or three dimensions that are capable of providing information about an environment, such as, but not limited to, topologies (such as intersections), streets, mountain ranges, roads, terrain, and the environment in general. The map(s) 708 may also include data structures capable of providing information about buildings, including but not limited to floorplans, blueprints, layouts, equipment models and locations of equipment, and/or other building-centric information. As noted above, while the map(s) 708 may be stored in the memory 706 of the computing device(s) 702, in other implementations, the map(s) 708 may be accessed by the computing device(s) 702, e.g., via a network 722.

In at least one example, the worksite plan(s) 710 (which may be the same as or similar to the worksite plans 122) can include information about tasks, jobs, or function to be carried out. For instance, the worksite plan(s) 710 can include information about a type of job or task to be carried out, a location for the job or task to be carried out, and, optionally, one or more conditions for performing the job or task. In at least some examples, the worksite plan(s) 710 can include jobs or tasks to be performed by a machine that is remotely-operated or that is semi- or fully-autonomous. In examples, the information about the one or more conditions for performing the job or task may be based on requirements for performing the remote, semi-autonomous, or fully-autonomous task. Additional examples of the worksite plan(s) 710 are provided herein.

In some instances, the worksite mapping system 712 (which may be or include functionality associated with the worksite mapping component 124) can include functionality to determine coordinates of a worksite to be validated. In examples, the worksite mapping system 712 can receive information about the extents of a worksite, such as the worksite 214, at which a job specified by the worksite plan 710 is to be performed. For example, the worksite plan 710 can include the coordinates of the worksite 214, and the worksite mapping system 712 can identify the coordinates relative to information from the map(s) 708. In other examples, the worksite mapping system 712 can determine extents or coordinates of the worksite 214 using other methods. For instance, the worksite mapping system 712 can include functionality to determine a perimeter or area within which a task is to be performed, for instance, based on the type of job or task, the extents of the environment 100, a type of machine available to perform the task, or other information. By way of non-limiting example, the worksite mapping system 712 can map the area based on amount of earth to moved, material to be extracted, or the like. As described further herein, the worksite mapping system 712 can generate the map 206 provide on the display 204 of the user device 202.

In some examples, the worksite validation system 714 (which may be or include functionality associated with the worksite validation component 126) can include functionality to determine that a worksite is appropriate for performing a task. In examples described above, the worksite validation system 714 may receive sensor data from one or more sources and determine, based on the sensor data, validate the worksite. As detailed above in connection with FIGS. 3-5, the worksite validation system 714 can receive location information associated with personnel tasked with performing a visual inspection of the worksite. Using this location information, the worksite validation system 714 can determine that the worksite has been visually inspected. For instance, the worksite validation system 714 can determine that the personnel has completely traversed an area associated with the worksite, e.g., a perimeter of the worksite, one or more locations at the worksite, or the like.

In addition to using position data to determine that the worksite has been visually inspected, the worksite validation system 714 can determine that additional conditions also are met. For example, the worksite validation system 714 can include functionality to perform image analysis on images of the worksite, e.g., to determine whether objects, personnel, or other conditions are present at the worksite. Also in examples, the worksite validation system can receive weather-related information, e.g., from sensors proximate the worksite, to determine weather-related conditions. Also in examples, the worksite validation system 714 can receive information associated with user inputs at a device associated with worksite.

In some examples, the graphical user interface generation system 716 can include functionality to generate one or more interactive interfaces, such as the graphical user interfaces 200, 300, 400, 500, 600 for presentation on a display. In some examples, the GUI generation system may receive information from the map(s) 708, the worksite plan(s) 710, the worksite mapping system 712, the worksite validation system 714, and/or additional data 718 to generate the GUIs. By way of nonlimiting example, the GUI generation system 716 may use the map(s) 708 and data generated by the worksite mapping system 712 to generate the map 206 showing the worksite 214 in the environment 100 and relative to a current position of the user device displaying the map 206. Moreover, the GUI generation system 716 may receive information about worksite conditions that must be met to perform certain tasks. For instance, such information may be displayed as instructions, as in the graphical user interface 300 and/or as a checklist or similar list as in the graphical user interface 600. Also in examples, the graphical user interface generation system can receive information about locations of objects in an environment, e.g., to configure the GUIs to include graphical representations of such objects. As also described above, GUIs generated the GUI generation system 716 may provide interactive elements, such as user interface elements that allow for interaction by a user with the GUIs. In the example GUI 600 of FIG. 6, the list 604 may be determined based on the worksite plan(s) 710 and the user interface controls 606 may be generated to allow a user to confirm that items on the list 604 are completed. The GUI generation system 716 may also access templates, logic, APIs, plug-ins, and/or other software, firmware, or data necessary to render the GUIs.

The computing device(s) 702 may also include communication connection(s) 720 that enable communication between the computing device(s) 702 and other local or remote device(s). For instance, the communication connection(s) 720 can facilitate communication with other computing devices such as the computing device(s) 724, the machines 104, the communication devices 108, 112, the sensing devices 110, 114, 116, and/or one or more networks, such as the network(s) 722. For example, the communications connection(s) 720 can enable Wi-Fi-based communication such as via frequencies defined by the IEEE 802.11 standards, short range wireless frequencies such as BLUETOOTH®, other radio transmission, or any suitable wired or wireless communications protocol that enables the respective computing device to interface with the other computing device(s).

In some implementations, the computing device(s) 702 can send information, such as sensor data, to the computing device(s) 724, via the network(s) 722. The computing device(s) 724 can receive the sensor data from the computing device(s) 702 and/or from the sensing devices 110, 114, 116 directly, and can perform some of the functions attributed to the computing device(s) 702. In at least one example, the computing device(s) 724 can include processor(s) 726 and memory 728 communicatively coupled with the processor(s) 726. In the illustrated example, the memory 728 of the computing device(s) 724 can store a worksite validation component 714. The worksite validation component 714 may correspond to the worksite validation system 712 described above.

The processor(s) 704 of the computing device(s) 702 and the processor(s) 726 of the computing device(s) 724 can be any suitable processor capable of executing instructions to process data and perform operations as described herein. By way of example and not limitation, the processor(s) 704 and 726 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 706 and the memory 728 are examples of non-transitory computer-readable media. The memory 706, 728 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As also illustrated in FIG. 7, the computing device(s) 702 may also communicate with the machines 104, the communication devices 108, 112, the sensing components 110, 114, and/or the sensors 116. Although the computing device(s) 702 are illustrated as communicating with such machines and devices via the network(s) 722, in other implementations, the computing devices 702 may be in direct communication with the machines and/or devices. By way of non-limiting example, in some implementations some aspects and/or functionality ascribed to the computing device(s) 702 may be performed on a communication device 108, such as on the user device 202. Similarly, the machines 104, the communication devices 108, 112, the sensing components 110, 114, and/or the sensors 116 may be in direct communication with the computing devices 724. As further illustrated in FIG. 7, the sensing devices (e.g., the sensing components 110, 114 and/or the sensors 116) may include one or more sensor system(s) 732. In at least one example, the sensor system(s) 732 can include location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), LIDAR sensors, RADAR sensors, ultrasonic transducers, SONAR sensors, etc. The sensor system(s) 732 can include multiple instances of each of these or other types of sensors. For instance, each of the machines 104 may have multiple cameras disposed at various locations about the exterior and/or interior of the machine. The sensor system(s) 732 can provide input to the computing device(s) 702 and/or the computing device(s) 724, e.g. via a communications system 734. Additionally, and/or alternatively, the sensor system(s) 732 can send sensor data, via the communications system 734 and/or the network(s) 722, to the computing device(s) 702 and/or to the computing device(s) 724 at a particular frequency, after a lapse of a predetermined period of time, in near real-time, etc.

It should be noted that while FIG. 7 is illustrated as a distributed system, in alternative examples, components of the computing device(s) 702 can be associated with the computing device(s) 724 and/or components of the computing device(s) 724 can be associated with the computing device(s) 702. Moreover, although various systems and components are illustrated as being discrete systems, the illustrations are examples only, and more or fewer discrete systems may perform the various functions described herein.

Figure 8:
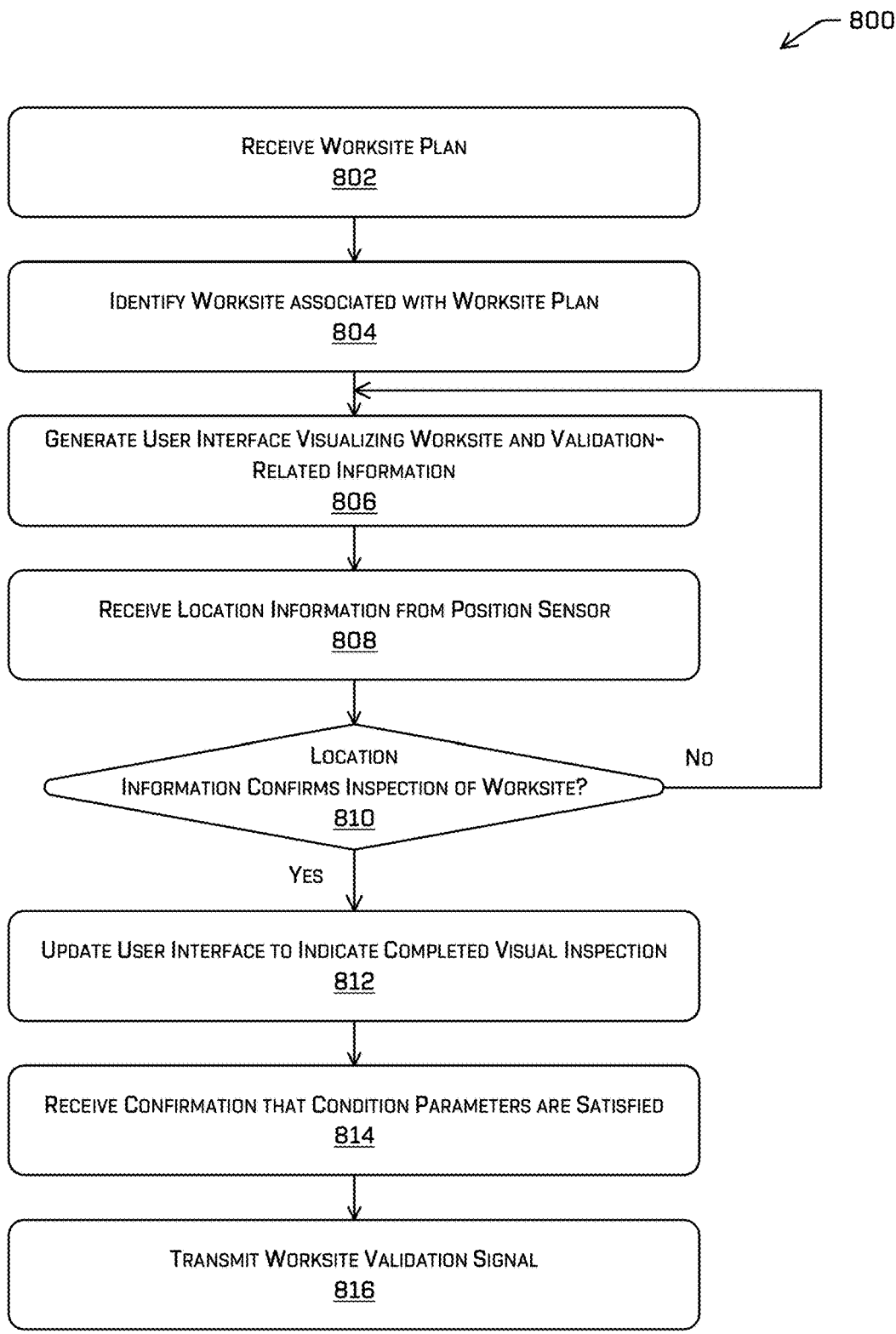
FIG. 8 is a flowchart illustrating an example method of validating a worksite in accordance with an example embodiment of the present disclosure.
Figure 9:
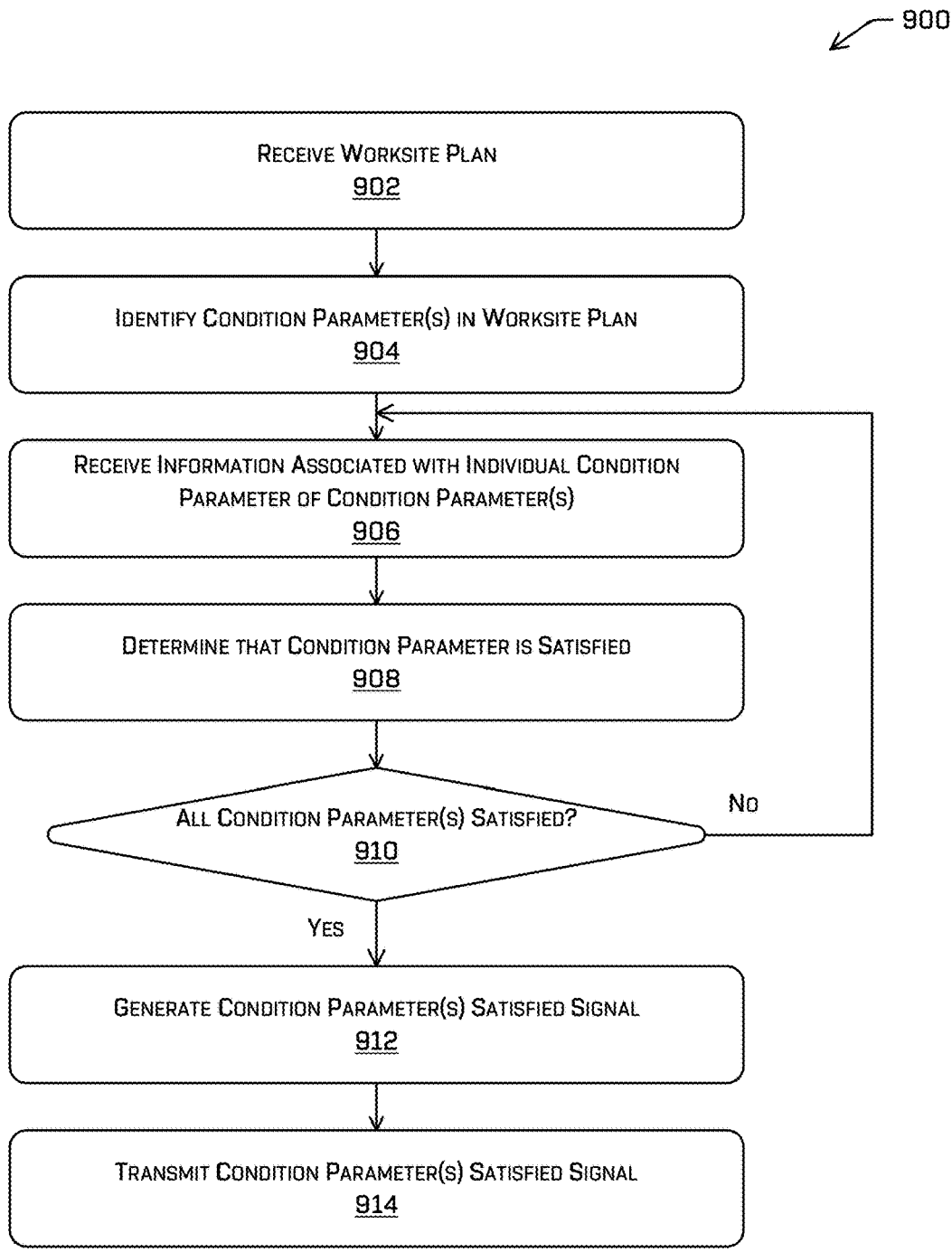
FIG. 9 is a flowchart illustrating an example method associated with validating worksite in accordance with an example embodiment of the present disclosure.

FIGS. 8 and 9 illustrate flow charts depicting example processes 800, 900e of the present disclosure for validating worksites. The example processes 800, 900 are illustrated as a collection of steps in a logical flow diagram, which steps represent operations that can be implemented in hardware, software, or a combination thereof. In the context of software, the steps represent computer-executable instructions stored in memory. When such instructions are executed by, for example, the processor(s) 704, such instructions may cause the controller processor(s) 704, various components of the computing device(s) 702, the computing device(s) 724, the machines 104 and/or the communication device(s) 108, 112 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the processes 800, 900 are described with reference to the environment 100, the GUIs 200, 300, 400, 500, 600, the computing system 700, and/or other items shown in FIGS. 1-7.

As noted, the process 800 is illustrated in FIG. 8 and generally describes a method of validating a worksite. The process 800 includes, at 802, receiving a worksite plan. For example, the computing device(s) 702 may receive data, e.g. via one or more signals, indicative of a task or job to be performed in the environment 100. For instance, the worksite plan may be the worksite plans 122, 710, and may include boundary information about an area in which the task or job is to be performed, e.g., the extents of a worksite, one or more conditions required to validate the worksite for the job, and/or any other information about the task or job.

The process 800 may also include, at 804, identifying a worksite associated with the worksite plan. For example, the computing device(s) 702, e.g., using the worksite mapping system 712, may determine the extents of a worksite, such as the worksite 214, from the worksite plan received at 802. In some examples, the extents, e.g., size, dimensions, locations, or the like, may be included in the worksite plan, and the worksite mapping system 712 may determine the location of the worksite 214 on one or more of the map(s) 708. In other examples, the computing device(s) 702 may otherwise determine the worksite location based on the worksite plan. By way of non-limiting example, the additional data 718 can include information about a correspondence between worksites, e.g., sizes, shapes, required conditions, and tasks to be performed. Accordingly, the computing device(s) 702 may determine details about the worksite based on the worksite plan.

The process 800 may also include, at 806, generating a user interface visualizing the worksite and validation-related information. For example, the techniques described herein may generate the graphical user interface 200 which includes the map 206 illustrating the worksite 214 and the environment. The graphical user interface 200 also includes a current location of the device on which the GUI is displayed, e.g., to orient personnel associated with the device in the environment and relative to the worksite 214. As detailed above, the graphical user interface 200 may also include user interface elements 214, 216, 218, via which a user, such as a supervisor or the like, reviewing the map 206 on the user device 200 may obtain additional information about a validation task to be performed. Also in examples, the GUI can include an inspection status indicator, indicating a percentage, amount, or other metric associated with inspecting or validating the worksite.

The process 800 may also include, at 808, receiving location information from a position sensor. For example, the techniques described herein can include receiving information about a location of the user device 202 on which the graphical user interface generated at 806 is displayed. In other examples, the location information may be associated with a different sensing device associated with personnel tasked with inspecting and/or validating a worksite. By way of non-limiting example, the position sensor may be associated with a wearable device, e.g., a watch, armband, or the like, worn by the personnel, a vehicle in which the personnel may be riding, an electronic device associated with the personnel, e.g., a mobile phone, or some other sensing device.

The process 800 may also include, at 810, determining whether the location information confirms an inspection of the worksite. For example, the worksite validation component 714 may determine whether the personnel have been in position to visually inspect an entirety of the worksite. In at least some examples, the worksite validation component 714 can compare the location information to one or more locations associated with the worksite. Such locations may include a perimeter of the worksite, one or more points on or near the perimeter, one or more points in the worksite, or other positions that may provide the personnel with an opportunity and/or vantage point to inspect the worksite.

If it is determined, at 810, that the location information does not confirm inspection of the worksite, the process 800 reverts to 806. For instance, if the personnel has not yet traversed the perimeter of the worksite or has not been present at one or more predetermined locations associated with the worksite, an updated graphical user interface can be generated illustrating an updated position of the personnel, e.g., based on most-recently received location information, and/or updating a status of the validation. An example of an updated GUI may be shown in FIG. 4.

Alternatively, if it is determined, at 810, that the location information does confirm inspection of the worksite, the process 800 can include, at 812, updating the user interface to indicate the completed visual inspection. In the example GUI 500 shown in FIG. 5, the worksite 214 may be highlighted, shaded, or otherwise illustrated differently and/or the inspection status indicator may demonstrate that 100% of the worksite has been updated. In some examples, other indicators may be displayed on the graphical user interface illustrating that the worksite has been inspected.

In some implementations, the process 800 can also include, at 814, receiving confirmation that condition parameters are satisfied. For example, and as detailed herein, conditions in addition to and/or ascertained via a visual inspection may be necessary for certain tasks to be performed at a worksite. By way of non-limiting examples, some tasks may be performed only in certain weather conditions, in the absence of people or objects in the work area, when the ground at the worksite meets certain parameters including grade, soil composition or the like, and/or when certain other criteria are met. In the example graphical user interface 600, a user may confirm a number of parameters via interaction with the elements 606 associated with the list 604. In other examples, instead of or in addition to a user acknowledgment of conditions or parameters, sensor data, such as from one of the sensing system(s) 732 associated with one or more of the sensing devices 110, 114, 116 may generate data about the worksite, and such data may be used to confirm additional parameters necessary for validating the worksite. In at least some examples, the additional information can be a user selection confirming validation, e.g., an affirmative action but the user that each of the conditions required for validation is met.

The process 800 can also include, at 816, transmitting a worksite validation signal. For example, having confirmed that the worksite has been inspected and all required conditions are met, the worksite validation system 714 can transmit the validation signal to the computing system(s) 120. The computing system(s) 120 may, in turn, commence the task at the worksite, e.g., by transmitting instructions to a remote user to commence a remotely-controlled machine-based task and/or by authorizing an autonomous or semi-autonomous machine to perform the task.

The process 900 is illustrated in FIG. 9 and generally describes a method of confirming that condition parameters are satisfied, e.g., prior to validating a worksite. In some examples, the process 900 can be associated with the operation 814 discussed above, although the operation 814 may include additional, less, or different functionality than illustrated in the process 900 and the process 900 may be performed other than in association with the process 800.

The process 900 includes, at 902, receiving a worksite plan. Functioning associated with 902 may be substantially the same as functioning associated with 802, discussed above. In examples, the processes 800, 900 may be performed in parallel and the operations 802 and 902 may be the same operation. For example, the computing device(s) 702 may receive data, e.g. via one or more signals, indicative of a task or job to be performed in the environment 100. For instance, the worksite plan may be the worksite plans 122, 710, and may include boundary information about an area in which the task or job is to be performed, e.g., the extents of a worksite, one or more conditions required to validate the worksite for the job, and/or any other information about the task or job. The process 900 may also include, at 904, identifying one or more condition parameters in the worksite plan. As detailed herein, a worksite plan may enumerate a number of condition parameters that must be satisfied at a worksite prior to commencement of a job or task, e.g., a job or task to be performed autonomously, semi-autonomously, or via remote control. Examples of condition parameters are detailed further herein and can include, without limitation, physical conditions, environmental conditions, equipment information, equipment conditions, or the like.

The process 900 may also include, at 906, receiving information associated with an individual condition parameter of the condition parameter(s). For example, the worksite validation component 714 can receive sensor data from one or more of the sensing system(s) 732 to determine information pertinent to the condition parameters. By way of non-limiting example, the worksite validation component 714 can receive environmental data, e.g., weather data, from the additional sensor(s) 116 proximate the worksite. In other examples, the worksite validation component 714 can receive image data from one or more sensor modalities, including but not limited to, from the user device 202. In other examples, 906 can include receiving a signal associated with a user interaction, e.g., with one of the GUIs 300, 400, 500, 600 indicating that she has confirmed, e.g., via a visual inspection, information associated with a visual inspection. By way of non-limiting example, the user may confirm satisfaction of a condition using the elements 606.

The process 900 may also include, at 908, determining that the condition parameter is satisfied. For example, based on the sensor data received at 906, the worksite validation component 714 can determine that the condition parameter is satisfied. For instance, the worksite validation component 714 may determine that the temperature and humidity at the worksite are within an acceptable range. In other examples, the worksite validation component 714 can confirm from sensor data received from one of the machines 104 that the machine can perform the task. In some examples, the operation 908 can confirm that the condition parameter is satisfied by receiving information from the user tasked with inspecting, e.g., by traversing, the worksite. As noted above, such a user may interact with a GUI, such as the GUI 500, to confirm that she has determined, e.g., by a visual inspection, that the condition parameter is satisfied.

The process 900 can also include, at 910, determining whether all condition parameter(s) are satisfied. If all condition parameters are not satisfied, the process 900 can return to the operation 906. In some instances, the process 900 can include highlighting or otherwise alerting to a user those parameters that are not yet satisfied. Also in examples, the process 900 can include requesting additional information, e.g., specific to the parameter(s) not yet satisfied.

Alternatively, if at 910 it is determined that all condition parameter(s) are satisfied, the process 900 can include, at 912, generating a condition parameter(s) satisfied signal and, at 914, transmitting the condition parameter(s) satisfied signal. In some examples, the condition parameter(s) satisfied signal can be required to generate and transmit a validation signal, as in the operation 816 discussed above. Stated differently, the validation signal may require that all condition parameters are satisfied prior to being transmitted, and therefore authorizing performance of the task(s) or job(s) enumerated in the worksite plan received at 902.

INDUSTRIAL APPLICABILITY

The present disclosure provides systems and methods for validating a worksite 128, e.g., for execution of a job or task by one or more machines 104 at the worksite 128. Such systems and methods may be used to more efficiently and safely coordinate activities of the machines 104 during operations at the worksite 128, for example to allow for non-line of sight or remote control of the machines 104 and/or autonomous or semi-autonomous machine control. For example, such systems and methods may enable a computing system(s) 120 to determine attributes of the worksite 128 correspond to prerequisites for performing desired tasks and maintain incident-free operation at the worksite. As a result, the computing system(s) 120 may confirm that desired operations can be performed prior to performing such operations, and thus, may maximize efficiency at the worksite 128. Additionally, such systems and methods may be used to more accurately manage the operation of the machines 104 at the worksite 128, thereby reducing operating costs.

As noted above with respect to FIGS. 1-8, example processing of validating a worksite may include receiving a worksite plan 122 and determining, based on the worksite plan 122, information about a location and extents of a worksite 128. In some examples, the worksite plan 122 can also include information about additional conditions that must be confirmed at the worksite 128. Based on the location and extents of the worksite 128, the worksite mapping component 124 can identify the worksite 128 in map data. The map data can be displayed to a user, such as via a graphical user interface on a portable electronic device 202. Moreover, location data associated with the user, e.g., from a location sensor on the portable electronic device 202, can be used to display the map data, along with the current location of the user relative to a representation 214 of the worksite 128.

The process may also include receiving additional location data, e.g., from the location sensor on the portable electronic device 202, to determine whether the user associated with the device 202 has been in position to visually inspect the worksite 128. For instance, the worksite validation component 126 can compare location data to one or more positions associated with the worksite 128. In at least some examples, the locations can be one or more locations along the perimeter, e.g., corners of the perimeter, one or more locations within the perimeter, e.g. a center of the worksite, and/or other positions. By way of non-limiting example, techniques described herein may cause the computing system(s) 120 to control a one of the machines 104 to commence performance of a task when the worksite is validated and prevent a machine from operating in the absence of such validation. In other implementations, the computing system(s) 120 may transmit a message or the like to a remote operator to commence the task or job at the now-validated worksite 128.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A computer-implemented method comprising:
   receiving, at a computing device, a worksite plan including at least one task to be executed by a machine at a worksite and a boundary of the worksite;
   receiving, from a second computing device disposed proximate the worksite, sensor data generated by at least one sensor associated with the second computing device;
   displaying, on a display of the computing device, a user interface comprising a map including a representation of the boundary of the worksite and a representation of a location of the computing device;
   receiving location information including one or more updated locations of the computing device;
   generating, using the computing device, based on the location information, a validation signal indicating that the worksite has been validated;
   transmitting the validation signal from the computing device; and
   responsive to receipt of the validation signal, transmitting instructions to commence the at least one task by the machine at the worksite,
   wherein said generating the validation signal is further based on the sensor data, and
   wherein the machine is autonomous or semi-autonomous, the at least one task being autonomously or semi-autonomously performed by the machine.

2. The computer-implemented method of claim 1, further comprising:
   determining that the worksite has been validated based at least in part on the one or more updated locations corresponding to one or more predetermined locations associated with the worksite.

3. The computer-implemented method of claim 2, wherein the one or more predetermined locations associated with the worksite comprise at least one of locations proximate the boundary of the worksite or locations within the boundary of the worksite.

4. The computer-implemented method of claim 2, further comprising:
   generating, based at least in part on the one or more updated locations corresponding to the one or more predetermined locations associated with the worksite, an updated user interface, the updated user interface including at least one user interface element; and
   receiving, at the computing device, a user input indicative of an interaction of the user with the at least one user interface element,
   wherein the generating the validation signal is further based on the user input.

5. The computer-implemented method of claim 1, wherein the worksite plan further includes a set of worksite condition parameters, the computer-implemented method further comprising:
   receiving, via a user interaction with at least one of the user interface or the computing device, a validation of the at least one worksite condition parameter,
   wherein the generating the validation signal is further based on the validation of the at least one worksite condition parameter.

6. The computer-implemented method of claim 5, wherein the set of worksite condition parameters comprises at least one of a ground composition, a grade associated with the worksite, a weather condition associated with the worksite, an identification of one or more objects at the worksite, or an identification of one or more people at the worksite.

7. The computer-implemented method of claim 1, wherein the sensor data comprises at least one of image data, position data, weather data, or altitude data.

8. The computer-implemented method of claim 7, wherein the at least one sensor that generates the sensor data is associated with another machine located proximate the worksite.

9. A system comprising:
a computing device;
one or more sensors;
one or more processors; and
memory storing processor-executable instructions that, when executed by the one or more processors, configure the system to perform acts comprising:
receiving a worksite plan, the worksite plan including a boundary of a worksite at which a machine is to perform a task, at least one worksite condition parameter associated with the worksite, and information about the task to be performed by the at least one machine at the worksite;
receiving, from the one or more sensors, sensor data associated with the worksite, the sensor data comprising at least one of location data or image data,
based at least in part on the sensor data, generating a first signal indicating that the worksite has been visually inspected;
receiving condition parameter data indicating that the at least one worksite condition parameter is satisfied;
generating, for display on the computing device, a graphical user interface comprising a graphical representation of the worksite and a user interface element;
based on the first signal, the condition parameter data, and a user input indicative of a user interaction with the user interface element, generating a validation signal indicating that the worksite has been validated;
transmitting the validation signal; and
only when the validation signal has been generated and transmitted, controlling the machine to perform the task at the worksite,
wherein the machine is autonomous or semi-autonomous, the task being autonomously or semi-autonomously performed by the machine in response to the transmitted instructions.

10. The system of claim 9, wherein the user interaction with the user interface element corresponds to at least one of a user validation of the at least one worksite condition parameter or a user validation of the visual inspection.

11. The system of claim 9, wherein the sensor data comprises the location data, the acts further comprising:
determining that the location data corresponds to a plurality of locations, the plurality of locations comprising at least one of one or more first locations proximate the boundary or one or more second locations inside the boundary.

12. The system of claim 11, wherein the one or more sensors comprise a location sensor associated with the computing device.

13. The system of claim 9, wherein the one or more sensors comprise an image sensor configured to generate the image data as one or more images of the worksite, the acts further comprising:

analyzing the one or more images; and
determining that the one or more images are indicative of a valid worksite.

14. The system of claim 13, wherein the image sensor is disposed on a machine located proximate the worksite or on the computing device.

15. The system of claim 13, the acts further comprising:
receiving, via a user interaction with at least one of the user interface or the computing device, a validation of the at least one worksite condition parameter,
wherein the generating the validation signal is further based on the validation of the at least one worksite condition parameter.

16. Non-transitory computer-readable media storing instructions that, when executed by one or more processors, perform actions comprising:
receiving a worksite plan, the worksite plan including a boundary of a worksite at which a machine is to perform a task, at least one worksite condition parameter associated with the worksite, and information about the task to be performed by the at least one machine at the worksite;
receiving, from one or more sensors, sensor data associated with the worksite, the sensor data comprising at least one of location data or image data,
based at least in part on the sensor data, generating a first signal indicating that the worksite has been visually inspected;
generating, for display on the computing device, a graphical user interface comprising a graphical representation of the worksite and a user interface element;
receiving condition parameter data indicating that the at least one worksite condition parameter is satisfied;
based on the first signal, the condition parameter data, and a user input indicative of a user interaction with the user interface element, generating a validation signal indicating that the worksite has been validated; and
transmitting the validation signal; and
transmitting instructions for each said at least one machine to perform the task,
wherein each said at least one machine is either autonomous or semi-autonomous, the task being autonomously or semi-autonomously performed by the machine in response to the transmitted instructions.

17. The non-transitory computer-readable media of claim 16, wherein the user interaction with the user interface element corresponds to at least one of a user validation of the at least one worksite condition parameter or a user validation of the visual inspection.

18. The non-transitory computer-readable media of claim 16, wherein the sensor data comprises the location data, the acts further comprising:
determining that the location data corresponds to a plurality of locations, the plurality of locations comprising at least one of one or more first locations proximate the boundary or one or more second locations inside the boundary.

19. The non-transitory computer-readable media of claim 16, wherein the sensor data comprises the image data and the image data comprises one or more images of the worksite, the acts further comprising:
analyzing the one or more images; and
determining that the one or more images are indicative of a valid worksite.

* * * * *